(12) United States Patent
Angeletti et al.

(10) Patent No.: US 12,308,915 B2
(45) Date of Patent: May 20, 2025

(54) RECONFIGURABLE DIGITAL BEAMFORMING NETWORK

(71) Applicant: European Space Agency, Paris (FR)

(72) Inventors: Piero Angeletti, Noordwijk (NL); Adem Coskun, Essex (GB); Izzet Kale, Mitcham (GB)

(73) Assignee: European Space Agency, Paris (FR)

( * ) Notice: Subject to any disclaimer, the term of this patent is extended or adjusted under 35 U.S.C. 154(b) by 188 days.

(21) Appl. No.: 18/346,586

(22) Filed: Jul. 3, 2023

(65) Prior Publication Data

US 2024/0007161 A1 Jan. 4, 2024

(30) Foreign Application Priority Data

Jul. 4, 2022 (EP) ..................................... 22182780

(51) Int. Cl.
*H04B 7/06* (2006.01)
(52) U.S. Cl.
CPC .................................. *H04B 7/0617* (2013.01)
(58) Field of Classification Search
CPC ...................................................... H04B 7/0617
USPC ........................................................ 375/267
See application file for complete search history.

(56) References Cited

U.S. PATENT DOCUMENTS

| | | | | |
|---|---|---|---|---|
| 8,614,940 B1 * | 12/2013 | Dybdal | ................ | H04J 11/0066 370/542 |
| 2011/0102263 A1 * | 5/2011 | Angeletti | ................ | H01Q 3/40 342/373 |

OTHER PUBLICATIONS

Schelkunoff, S. A. "A Mathematical Theory of Linear Arrays," Bell System Technical Journal, vol. 22, No. 1, pp. 80-107, Jan. 1943.
Von Aulock, W. H. "Properties of Phased Arrays," Proceedings of the IRE, vol. 48, No. 10, pp. 1715-1727, Oct. 1960.
Dutt, A. et al. "Fast Fourier Transforms for Nonequispaced Data," SIAM Journal on Scientific Computing, vol. 14, No. 6, pp. 1368-1393, 1993.
Potts, D. et al., "Chapter 1 Fast Fourier transforms for nonequispaced data: A tutorial," Modern Sampling Theory: Mathematics and Application, J. J. B. P. Ferreira, Ed. Boston, MA: Birkhauser, 2000, 23 pages.

(Continued)

*Primary Examiner* — Fitwi Y Hailegiorgis
(74) *Attorney, Agent, or Firm* — Seed IP Law Group LLP

(57) ABSTRACT

A method of transforming input signals received at N input signal ports to output signals for output at M output signal ports includes generating, from the input signals, first intermediate signals for processing by a fast Fourier transform (FFT), with a predefined number of input ports and output ports corresponding to a size of the FFT; applying the FFT to the first intermediate signals to obtain second intermediate signals; and generating the output signals from the second intermediate signals. The input signal ports are non-uniformly distributed with respect to the input ports in a first signal domain of the input ports; and/or the output signal ports are non-uniformly distributed with respect to the output ports in a second signal domain of the output ports. The disclosure further relates to beamforming networks, reconfigurability in beamforming and beam steering, wideband and narrowband multibeam antenna array devices, FFT processors, programs, and storage media.

20 Claims, 21 Drawing Sheets

(56) References Cited

OTHER PUBLICATIONS

Fourmont, K. "Non-Equispaced Fast Fourier Transforms with Applications to Tomography," The Journal of Fourier Analysis and Applications, vol. 9, Issue 5, pp. 431-450, Sep. 2003.
Orfanidis, S. J. "Chapter 22: Antenna Arrays," Electromagnetic Waves and Antennas, Available at: https://www.ece.rutgers.edu/~orfanidi/ewa/, Latest revision date—Aug. 1, 2016, 44 pages.
Kale, I. et al. "Overview of Digital Signal Processing, Session 2: The Fourier Summation Transform," Notes for the Short Course on DSP Communication Processor Design delivered by I. Kale, A. Coskun, S. Cetinsel, 2018, 7 pages.
Qu, L. et al. "Group Sparse Basis Pursuit Denoising Reconstruction Algorithm for Polarimetric Through-the-Wall Radar Imaging," International Journal of Antennas and Propagation, vol. 2018, Aug. 2018, 8 pages.
Capozzoli, A. et al. "Optimized Nonuniform FFTs and Their Application to Array Factor Computation," IEEE Transactions on Antennas Propagation, vol. 67, No. 6, pp. 3924-3938, Jun. 2019.

\* cited by examiner

RECONFIGURABLE DIGITAL BEAMFORMING NETWORK

BACKGROUND

Technical Field

This application relates to techniques for digital beamforming and digital beamforming networks, in particular reconfigurable digital beamforming networks. The application further relates to methods of transforming a plurality of input signals received at N input signal ports to a plurality of output signals for output at M output signal ports, to beamforming networks for transforming a plurality of input signals to a plurality of output signals, to wideband multibeam antenna array devices, to narrowband multibeam antenna array devices, and to fast Fourier transform (FFT) processors, as well as corresponding computer programs and computer-readable storage media.

Description of the Related Art

Advances in Digital Signal Processing (DSP) technologies and solutions greatly increase the capability and flexibility of today's satellite communication products and assets. When combined with state-of-the-art high bandwidth high speed mixed-signal-converters (Analog to Digital Converters (ADCs) and Digital to Analog Converters (DACs)), these improvements have the potential to shift the processing loads, traditionally assigned to analog components, into the more flexible digital domain. One of these digital solutions relates to the digital implementation of beamforming networks (BFNs).

A BFN enables generation of multiple simultaneous beams. This in turn enables frequency reuse by increasing the number of channels that the data is transferred through. Beamforming can be undertaken in the analog as well as in the digital domains. It is also possible to adopt a hybrid approach to yield benefits from the advantages of both domains. However, depending on the configuration of the inputs and outputs to/from the beamforming process, computational complexity may be high.

In view thereof, there is a need for fully digital beamforming at reduced complexity. There is further need for such beamforming techniques that can be applied to non-uniformly distributed input and/or output configurations, e.g., that can be applied to non-uniform antenna arrays and/or non-uniformly distributed beam directions. There is yet further need for beamforming techniques that are reconfigurable with respect to the input and/or output configurations, to accommodate for changes in the arrangement of antenna elements and/or changes of beam directions.

BRIEF SUMMARY

In view of some or all of these needs, the present disclosure proposes a method of transforming a plurality of input signals received at N input signal ports to a plurality of output signals for output at M output signal ports, a beamforming network for transforming a plurality of input signals to a plurality of output signals, a wideband multibeam antenna array device, a narrowband multibeam antenna array device, and a FFT processor, as well as corresponding computer programs and computer-readable storage media, having the features of the respective independent claims.

An aspect of the present disclosure relates to a method of transforming a plurality of input signals (e.g., N input signals) received at N input signal ports to a plurality of output signals (e.g., M output signals) for output at M output signal ports. The method may include generating, from the plurality of input signals, a plurality of first intermediate signals for processing by a fast Fourier transform, FFT. The FFT may have a predefined number of input ports and output ports corresponding to a size of the FFT. The method may further include applying the FFT to the plurality of first intermediate signals to obtain a plurality of second intermediate signals. The number of first intermediate signals and second intermediate signals may correspond to the size of the FFT. The method may yet further include generating, from the plurality of second intermediate signals, the plurality of output signals. Therein, the N input signal ports may be non-uniformly distributed with respect to the input ports of the FFT in a first signal domain. Additionally or alternatively, the M output signal ports may be non-uniformly distributed with respect to the output ports of the FFT in a second signal domain. The first signal domain may be a signal domain of the input ports of the FFT. The second signal domain may be a signal domain of the output ports of the FFT. In general, a signal domain may be one of a time domain and a frequency domain, or one of a space domain and a wavenumber domain. The second signal domain may be the dual Fourier transform domain of the first signal domain (and vice versa). Each input signal port and each input port of the FFT may be associated with a respective parameter value (e.g., a space coordinate value or wavenumber value) in the first signal domain. Further, each output signal port and each output port of the FFT may be associated with a respective parameter value (e.g., wavenumber value or space coordinate value) in the second signal domain. Depending on the distribution of the input signal ports with respect to the input ports of the FFT, one or more of the first intermediate signals may be zero. Likewise, depending on the distribution of the output signal ports with respect to the output ports of the FFT, one or more of the second intermediate signals may be disregarded when determining the output signals (i.e., one or more of the second intermediate signals may not enter the determination of the output signals).

Configured as defined above, the proposed method can cope with non-uniformity in the input data and/or the output data. Specifically, the method can cope with non-uniformity in the input signal ports (e.g., a non-uniform or non-equispaced arrangement of antenna elements) and/or non-uniformity in the output signal ports (e.g., non-uniform or non-equispaced beam directions). As such, the method can be adapted for use with arbitrary antenna configurations (e.g., arbitrary spatial arrangements of antenna elements of an array antenna) and/or arbitrary beam pointing directions, providing for additional flexibility compared to conventional solutions. Moreover, the proposed method allows for reconfigurability with respect to the input data and/or the output data. For example, the proposed method can accommodate for changes in the beam pointing directions and/or changes in the antenna configuration. Finally, enabling use of a FFT in these potentially non-uniform frameworks can reduce overall computational complexity and therefore, the consumption of available hardware resources and power.

In some embodiments, generating the first intermediate signals may involve routing, between input signal ports and input ports of the FFT, and scaling of input signals in accordance with their positions in the first signal domain and/or a distance relationship between respective input signal ports and input ports of the FFT in the first signal domain, and summing scaled signals from different input signal ports routed to the same input ports of the FFT. Routing (e.g., mapping) and scaling of the input signals may involve scaling the input signals and routing the scaled input signals to input ports of the FFT, or routing the input signals to input ports of the FFT and scaling the routed input signals prior to input to the FFT. Accordingly, the first intermediate signals may be generated based on linear combinations of the input signals. In other words, this may amount to interconnecting the input signal ports and input ports of the FFT, for example based on respective distances between ports in the first signal domain, while applying respective scaling factors (weight factors) to the interconnections.

Additionally or alternatively, generating the output signals may involve routing, between output ports of the FFT and output signal ports, and scaling of second intermediate signals in accordance with their positions in the second signal domain and/or a distance relationship between respective output ports of the FFT and signal output ports in the second signal domain, and summing scaled signals from different output ports of the FFT routed to the same output signal port. Accordingly, the output signals may be generated based on linear combinations of the second intermediate signals. This may be said to amount to interconnecting the output ports of the FFT and the output signal ports, for example based on respective distances between ports in the second signal domain, while applying respective scaling factors (weight factors) to the interconnections.

This provides for efficient means of linking the FFT to the non-uniform input data and/or the non-uniform output data, enabling to profit from the advantages of the FFT even for non-uniform input data and/or output data configurations.

In some embodiments, the FFT may be oversized with respect to the N input signal ports. Then, generating the plurality of first intermediate signals from the plurality of input signals may involve, for each input signal, applying respective first weight factors to each of a first predetermined number of identical signals derived from the input signal and mapping the weighted signals to respective input ports of the FFT, and for each input port of the FFT, summing the respective weighted signals for this input port to generate a respective first intermediate signal for input to the FFT. Alternatively, generating the plurality of first intermediate signals from the plurality of input signals may involve, for each input signal, mapping each of the first predetermined number of the identical signals derived from the input signal to respective input ports of the FFT and applying respective first weight factors to the mapped signals, and for each input port of the FFT, summing the respective weighted signals for this input port to generate a respective first intermediate signal for input to the FFT.

Additionally or alternatively, the FFT may be oversized with respect to the M output signal ports. Then, generating the plurality of output signals from the plurality of second intermediate signals may involve, for each output signal port, applying respective second weight factors to each of a second predetermined number of identical signals derived from the second intermediate signals, and mapping the weighted signals to the output signal port, and for each output signal port summing the respective weighted signals to generate a respective output signal. Alternatively, generating the plurality of output signals from the plurality of second intermediate signals may involve, for each output signal port, mapping the second predetermined number of second intermediate signals to the output signal port, applying respective second weight factors to the mapped signals, and for each output signal port summing the respective weighted signals to generate a respective output signal.

In the above and in the remainder of the present disclosure, the weight factors may also be referred to as scaling factors. The first and second predetermined numbers may be identical to each other in some implementations. The weight factors may also depend on an oversizing ratio (e.g., oversampling ratio) of the size of the FFT compared to the number of input signal ports or output signal ports, respectively, in addition to the non-uniformities and/or distance relationships.

In some embodiments, the first weight factors may be determined based on a first window function spanning the first predetermined number of identical signals derived from the input signal. A shape of the first window function may depend on a distance, in the first signal domain, from the respective input signal port to a closest one among the input ports of the FFT. Likewise, also respective mappings may be based on said distances in the first signal domain. Optionally, the first weight factors may further depend on any second window functions applied to second intermediate signals and comprise respective contributions for removing signal distortion resulting from said second window functions being applied.

Additionally or alternatively, the second weight factors may be determined based on a second window function spanning the second predetermined number of second intermediate signals. A shape of the second window function may depend on a distance, in the second signal domain, from the respective output signal port to a closest one among the output ports of the FFT. Likewise, also respective mappings may be based on said distances in the second signal domain. Optionally, the second weight factors may further depend on any first window functions applied to identical signals derived from input signals and comprise respective contributions for removing signal distortion resulting from said first window functions being applied.

In some embodiments, in a receive mode, the plurality of input signals may relate to N antenna signals received at respective antenna elements of an array antenna. Then, the plurality of output signals may relate to M beam signals corresponding to respective antenna beams of the array antenna. Alternatively, in a transmit mode, the plurality of input signals may relate to N beam signals corresponding to respective antenna beams to be transmitted by the array antenna. Then, the plurality of output signals may relate to M antenna signals for exciting respective antenna elements of the array antenna. As such, the method may be a method of transforming the plurality of antenna signals received at respective antenna elements of the array antenna to a plurality of beam signals corresponding to respective antenna beams in the receive mode, or transforming the plurality of beam signals to the plurality of antenna signals in the transmit mode.

In some embodiments, the method may further include receiving the plurality of N input signals from respective antenna elements of the array antenna and outputting the plurality of output signals as the beam signals in the receive mode. Alternatively, the method may further include outputting the plurality of output signals for transmission by the antenna elements of the array antenna in the transmit mode.

Another aspect of the disclosure relates to a beamforming network, BFN, for transforming a plurality of input signals to a plurality of output signals. The BFN may include a plurality of N input signal ports for receiving the input signals. The BFN may further include a plurality of M output signal ports for outputting the output signals. The BFN may further include a preprocessor module for generating, from the plurality of input signals, a plurality of first intermediate signals for processing by an FFT. The BFN may further include an FFT module for applying the FFT to the plurality of first intermediate signals to obtain a plurality of second intermediate signals, wherein the FFT has a predefined number of input ports and output ports corresponding to a size of the FFT. The BFN may yet further include a postprocessor module for generating, from the plurality of second intermediate signals, the plurality of output signals. Therein, the N input signal ports may be non-uniformly distributed with respect to the input ports of the FFT in a first signal domain. The first signal domain may be a signal domain of the input ports of the FFT. Additionally or alternatively, the M output signal ports may be non-uniformly distributed with respect to the output ports of the FFT in a second signal domain. The second signal domain may be a signal domain of the output ports of the FFT.

In some embodiments, the preprocessor module may be configured for routing, between input signal ports and input ports of the FFT, and scaling of input signals in accordance with their positions in the first signal domain and/or a distance relationship between respective input signal ports and input ports of the FFT in the first signal domain, and summing scaled signals from different input signal ports routed to the same input ports of the FFT.

Additionally or alternatively, the postprocessor module may be configured for routing, between output ports of the FFT and output signal ports, and scaling of second intermediate signals in accordance with their positions in the second signal domain and/or a distance relationship between respective output ports of the FFT and signal output ports in the second signal domain, and summing scaled signals from different output ports of the FFT routed to the same output signal port.

In some embodiments, the preprocessor module may be configured to, for each input signal, apply respective first weight factors to each of a first predetermined number of identical signals derived from the input signal and map the weighted signals to respective input ports of the FFT, and for each input port of the FFT, sum the respective weighted signals for this input port to generate a respective first intermediate signal for input to the FFT. Alternatively, the preprocessor module may be configured to, for each input signal, map each of the first predetermined number of identical signals derived from the input signal to respective input ports of the FFT and apply respective first weight factors to the mapped signals before input to the FFT, and for each input port of the FFT, sum the respective weighted signals for this input port to generate a respective first intermediate signal for input to the FFT. In another alternative, the preprocessor module may be configured to, for each input signal, map each of the first predetermined number of input signals to respective input ports of the FFT and apply respective first weight factors to the mapped signals before input to the FFT without the need for summation.

Additionally or alternatively, the postprocessor module may be configured to, for each output signal port, apply respective second weight factors to each of a second predetermined number of identical signals derived from the second intermediate signals, and map the weighted signals to the output signal port, and for each output signal port sum the respective weighted signals to generate a respective output signal. Alternatively, the postprocessor module may be configured to, for each output signal port, map the second predetermined number of second intermediate signals to the output signal port, apply respective second weight factors to the mapped signals, and for each output signal port sum the respective weighted signals to generate a respective output signal. In another alternative, the postprocessor module may be configured to, for each output signal port, apply respective second weight factors to each of a second predetermined number of signals derived from the second intermediate signals, and map the weighted signals to the output signal ports without the need for summation.

In some embodiments, the preprocessor module may be configured to determine the first weight factors based on a first window function spanning the first predetermined number of identical signals derived from the input signal. A shape of the first window function may depend on a distance, in the first signal domain, from the respective input signal port to a closest one among the input ports of the FFT. Optionally, the first weight factors may further depend on any second window functions applied to second intermediate signals and comprise respective contributions for removing signal distortion resulting from said second window functions being applied.

Additionally or alternatively, the postprocessor module may be configured to determine the second weight factors based on a second window function spanning the second predetermined number of second intermediate signals. A shape of the second window function may depend on a distance, in the second signal domain, from the respective output signal port to a closest one among the output ports of the FFT. Optionally, the second weight factors may further depend on any first window functions applied to identical signals derived from input signals and comprise respective contributions for removing signal distortion resulting from said first window functions being applied.

Another aspect of the disclosure relates to a wideband multibeam antenna array device. The wideband multibeam antenna array device may include the BFN according to the preceding aspect and any of its embodiments. The wideband multibeam antenna array device may further include an array of signal conditioning chains, each comprising an RF port and one or more analogue and/or digital signal processing units. Therein, the input signal ports of the beamforming network may be connected to the signal conditioning chains in a receive, Rx, mode to retrieve M beams at the output signal ports of the beamforming network. Alternatively, the output signal ports of the beamforming network may be connected to the signal conditioning chains in a transmit, Tx, mode to transmit N beams applied at the input signal ports of the beamforming network.

Another aspect of the disclosure relates to a narrowband multibeam antenna array device. The narrowband multibeam antenna array device may include two or more beamforming networks according to the above-mentioned aspect and any of its embodiments. The narrowband multibeam antenna array device may further include an array of signal conditioning chains, each comprising an RF port and one or more analogue and/or digital signal processing units. Therein, the input signal ports of the beamforming networks may be connected to the signal conditioning chains followed by frequency demultiplexers in a receive, Rx, mode to retrieve narrowband channels associated with multiple beams at the output signal ports of individual ones of the beamforming networks. Alternatively, the output signal ports of the beamforming networks may be connected to the signal conditioning chains in a transmit, Tx, mode through frequency multiplexers to transmit the narrowband channels associated with the multiple beams applied at the input signal ports of the beamforming networks.

Another aspect of the disclosure relates to a FFT processor including the BFN according to the above-mentioned aspect and any of its embodiments. Here, the FFT may be oversized with respect to at least one of the N input signal ports and the M output signal ports of the beamforming network. Further, the plurality of first weight factors and/or second weight factors may be reconfigurable according to the number of N input signal ports and to the number of M output signal ports. Yet further, the plurality of first weight factors and/or second weight factors may depend on a function of the amount of the oversizing of the FFT and the distributions of the input signal ports and output signal ports in respective signal domains.

Another aspect relates to a computer program including instructions for causing a processor, when executing the program, to perform the methods described throughout the disclosure.

Another aspect of the disclosure relates to a computer-readable storage medium storing the computer program according to the preceding aspect.

It will be appreciated that apparatus features and method steps may be interchanged in many ways. In particular, the details of the disclosed apparatus (e.g., BFN, antenna device, or FFT processor) can be realized by the corresponding method of operating the apparatus, and vice versa, as the skilled person will appreciate. Moreover, any of the above statements made with respect to the apparatus are understood to likewise apply to the corresponding method, and vice versa.

BRIEF DESCRIPTION OF THE SEVERAL VIEWS OF THE DRAWINGS

Example embodiments of the disclosure are explained below with reference to the accompanying drawings, wherein FIG. 1 schematically illustrates an example of non-uniformly distributed antenna elements of a planar antenna array.

DETAILED DESCRIPTION

In the following, example embodiments of the disclosure will be described with reference to the appended figures. Identical elements in the figures may be indicated by identical reference numbers, and repeated description thereof may be omitted for reasons of conciseness.

Broadly speaking, the present disclosure relates to a digital beamforming approach using a Fourier Transform. The realization of the Fourier Transform in the form of Discrete Fourier Transform (DFT) may not be the most efficient way, as it increases the computational complexity with the square of the number of samples to be processed, whereas the Fast Fourier Transform (FFT) has the ability to aid this problem by introducing a logarithmic increase in computational complexity. In case the input and/or the output of the DFT or the FFT is not uniform (non-uniformly distributed or, in other words, non-equispaced), it is also possible to perform non-uniform alternatives of the two such as Non-Uniform DFT (Nu-DFT) and Non-Uniform FFT (Nu-FFT).

Considering the beamforming process, it is more likely that the antenna element positions and the beam pointing directions are non-uniformly distributed. Therefore, if an FFT like approach is to be incorporated in digital beamforming, the non-uniformity should also be introduced into the FFT definition. The present disclosure also deals with how non-uniform distributions within the antenna arrays and/or beam configurations can be supported using the DFT, and in extension, by the FFT, additionally addressing the reconfigurability of beamforming networks.

The present disclosure further relates to the idea of generating multiple beams considering a general case of planar arrays. In addition, the disclosure relates to a more generic and simplified model for linear arrays. Accordingly, a number of non-limiting implementation examples relate to linear arrays, where it is understood that these examples can be readily extended to arrays of multiple dimensions with appropriate mathematical manipulations and modifications, as the skilled person will appreciate.

1. Generating Multiple Simultaneous Beams

1.1. Multiple Beam Generation Using Planar Arrays

Figure 1:
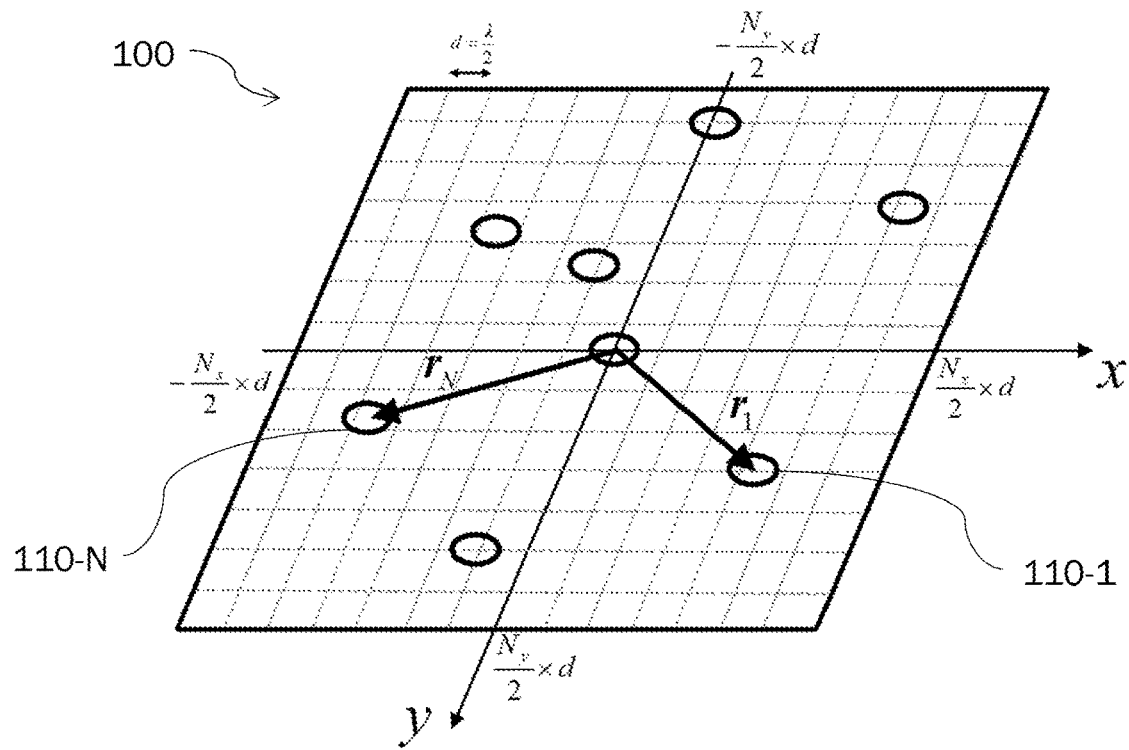

For the sake of ease of understanding and practicality, the following assumptions are made in the context of the present disclosure, without intended limitation:

Techniques according to the present disclosure use a planar array of dimensions $N_x d$ by $N_y d$ along the x-axis and y-axis respectively, with a total of N isotropic antenna elements are placed across the x-y plane. An example of such array antenna 100 (antenna array, array) is shown in FIG. 1, in which each circle 110-1, ..., 110-N represents an antenna element. Here, $$d = \frac{\lambda}{2}$$

can be chosen, where $\lambda$ is the wavelength, for example. The total size of the array antenna 100 is therefore, $N_x d \times N_y d$. Nevertheless, also other choices of d are possible, if needed.

Only the "phase" of the signals transmitted/received by each of the antenna element are altered for beam steering purposes, using phase shifters for example. On the other hand, the magnitudes of the transmitted/received signals at these antenna elements are only scaled by 1/N. Of course, the magnitudes can also be altered using different weightings to change the shape of the beam or to obtain lower sidelobes. However, amplitude tapering is not the primary focus in the context of the present disclosure. Setting all weights to 1/N, the overall radiation pattern will be sinc-like (sinc(x)=sin (πx)/πx) in the continuous domain and slink-like (slink(x)=sin(Nπx)/(N sin(πx))) in the discrete domain.

Considering these assumptions, the vector $r_n$ defining the position of an n-th antenna element is given by $$r_n = \hat{x} r_{x,n} + \hat{y} r_{y,n} = \hat{x} \times (x_n \times d) + \hat{y} \times (y_n \times d) \text{ for } n = 1, \ldots, N, \quad \text{[Eq. 1]}$$

$$\text{where } x_n \in \left[-\frac{N_x}{2}, \frac{N_x}{2}\right) \text{ and } y_n \in \left[-\frac{N_y}{2}, \frac{N_y}{2}\right). \quad \text{[Eq. 2]}$$

Figure 2:
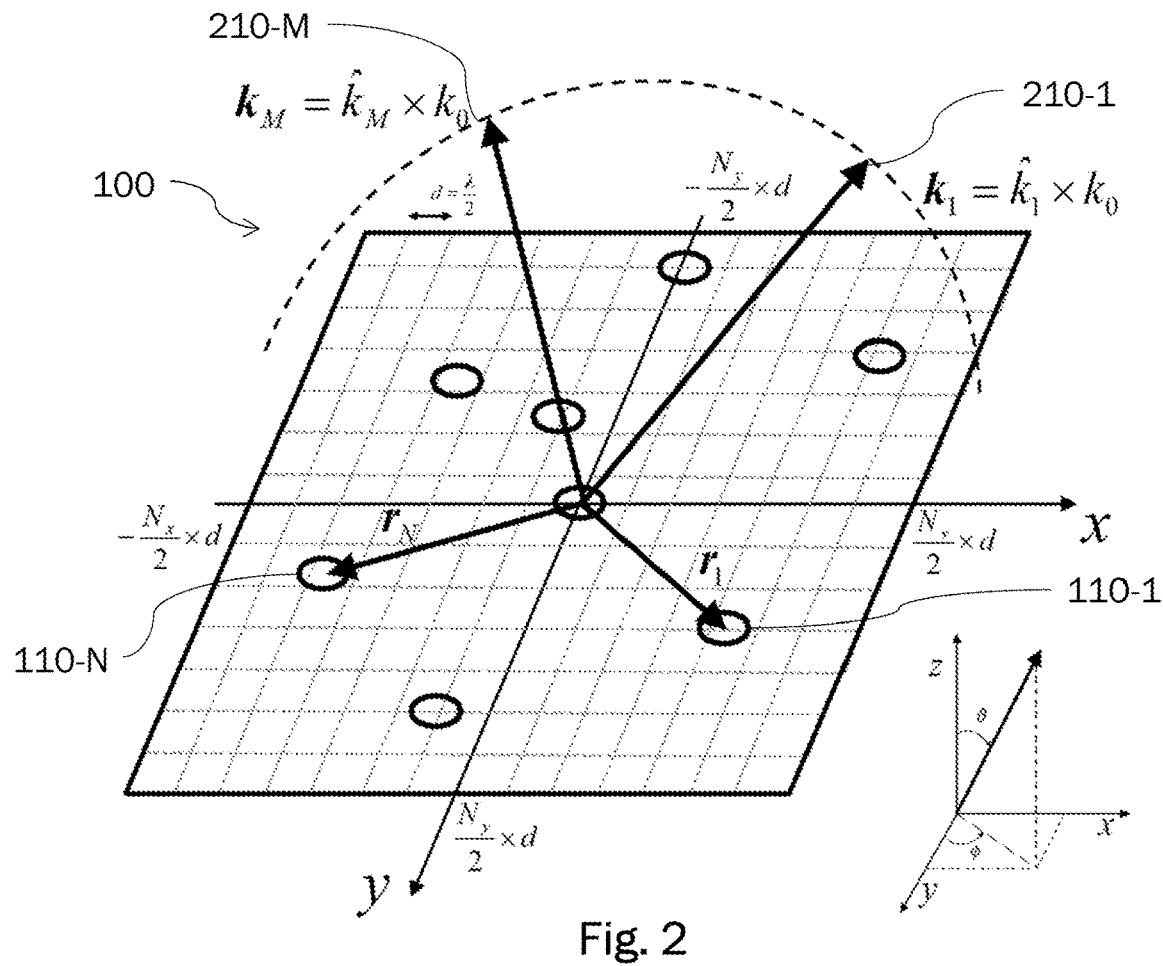
FIG. 2 schematically illustrates an example of non-uniformly distributed beam steering vectors for the antenna array of FIG. 1.

Next, a total of M beam steering vectors is assumed, as shown in FIG. 2 in which beam steering vectors 210-1, ..., 210-M are shown in addition to antenna elements 110-1, ..., 110-N of FIG. 1. Each of the M beam steering vectors may have a magnitude of $$k_0 = \frac{2\pi}{\lambda}, \quad \text{[Eq. 3]}$$

$$\text{where } k_m = \hat{k}_m \cdot k_0 = \hat{x} \underbrace{\cos(\phi_m)\sin(\vartheta_m)}_{u_m} + \hat{y} \underbrace{\sin(\phi_m)\sin(\vartheta_m)}_{v_m}$$

for $m = 1, \ldots, M$

Therein, $\vartheta_m$ is the polar angle and $\phi_m$ is the azimuthal angle as defined in the bottom-right corner of FIG. 2.

The vector of complex weights, exciting the antenna elements, corresponding to $k_m$ is given by $$w(k_m) = \left[e^{-jk_m r_1}, e^{-jk_m r_2}, \ldots, e^{-jk_m r_N}\right]^T = \quad \text{[Eq. 4]}$$
$$\left[e^{-j(x_1 \psi_{u,m} + y_1 \psi_{v,m})}, e^{-j(x_2 \psi_{u,m} + y_2 \psi_{v,m})}, \ldots, e^{-j(x_N \psi_{u,m} + y_N \psi_{v,m})}\right]^T,$$

where $\psi_{u,m} = u_m \times \pi$ and $\psi_{v,m} = v_m \times \pi$. The operator to transpose a matrix is expressed as $(\bullet)^T$.

Here, it is to be noted that the Schelkunoff phases ($\psi_{u,m}$ and $\psi_{v,m}$) and the direction cosine coordinates ($u_m$ and $v_m$) have useful properties for the interpretation of planar arrays' scanning performances and for the direct extension to non-uniform planar arrays.

Figure 3:
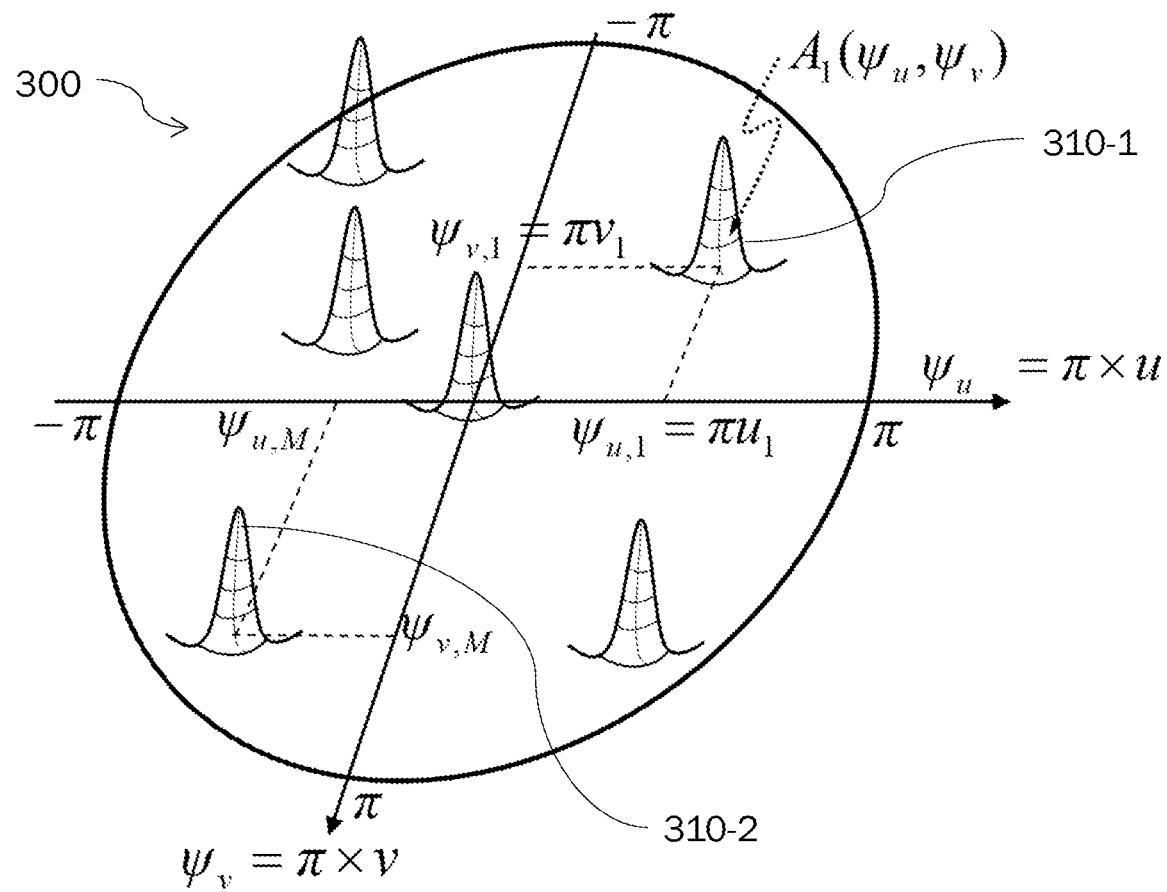
FIG. 3 schematically illustrates an example of array factors for generation of multiple simultaneous beams by the planar array antenna.

Using the Schelkunoff phases $\psi_{u,m}$ and $\psi_{v,m}$, M simultaneous beams can be defined. This is shown in FIG. 3, in which examples of array factors $A_m(\psi_u, \psi_v)$ for m=1, ..., M, 310-1, 310-2, ... are indicated in the Schelkunoff's phase domain 300.

The array factors describing these M beams (i.e., $A_m(\psi_u, \psi_v)$ for m=1, ..., M) can be formulated as follows, $$\begin{bmatrix} A_1(\psi_u, \psi_v) \\ A_2(\psi_u, \psi_v) \\ \vdots \\ A_M(\psi_u, \psi_v) \end{bmatrix} = \underbrace{\begin{bmatrix} w(k_1)^T \\ w(k_2)^T \\ \vdots \\ w(k_M)^T \end{bmatrix}}_{W} \times v(\hat{k}) = W \times v(\hat{k}) \quad \text{[Eq. 5]}$$

$$\text{where } v(\hat{k}) = \begin{bmatrix} v_1(\hat{k}) \\ v_2(\hat{k}) \\ \vdots \\ v_N(\hat{k}) \end{bmatrix} = \begin{bmatrix} e^{-j(x_1 \times \psi_u(\hat{k}) + y_1 \times \psi_v(\hat{k}))} \\ e^{-j(x_2 \times \psi_u(\hat{k}) + y_2 \times \psi_v(\hat{k}))} \\ \vdots \\ e^{-j(x_N \times \psi_u(\hat{k}) + y_N \times \psi_v(\hat{k}))} \end{bmatrix} \quad \text{[Eq. 6]}$$

and $v_n(\hat{k})$ is the omnidirectional pattern of the n-th antenna element. Therein, the W matrix corresponds to the DFT operation. In the remainder of the disclosure, W will be referred to as the Non-uniform-DFT (Nu-DFT) to distinguish from its uniform counterpart. It is understood that the non-uniformity results from the non-equispaced distribution of the input and/or output. Here and in the following, the terms "non-uniform" and "non-equispaced" will be used synonymously.

Figure 4:
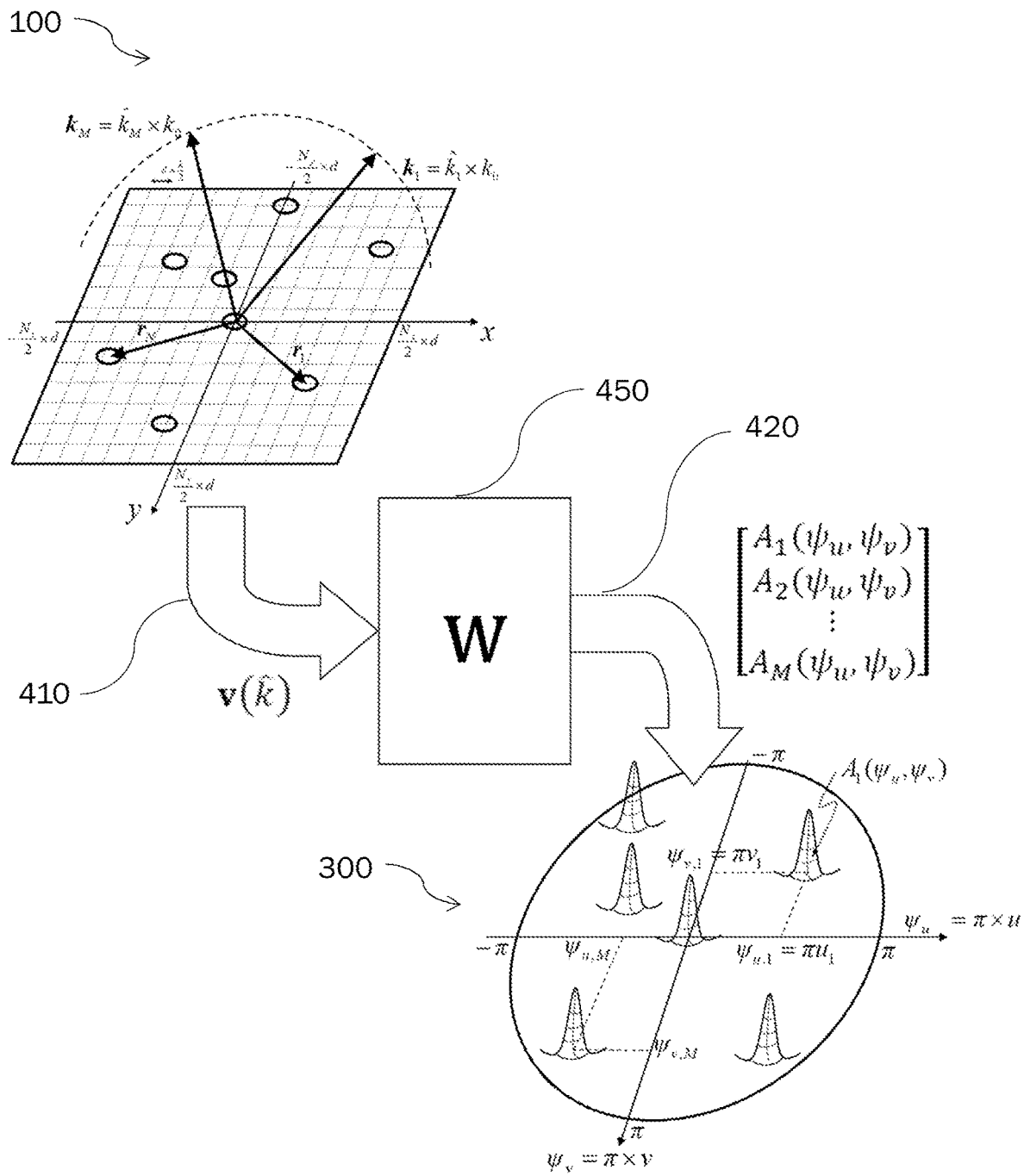
FIG. 4 schematically illustrates an example of using a non-uniform discrete Fourier transform for generating multiple beams by processing the signals arriving from multiple antenna elements of the planar array antenna.

A simplified example view of the idea of the use of the Nu-DFT to generate multiple simultaneous beams by processing the signals arriving from multiple antenna elements in a planar array is schematically illustrated in FIG. 4. Here, an arrangement of N antenna elements in an antenna array 100 and M beam steering vectors as shown for example in FIG. 2 can be assumed. The signals v($\hat{k}$) observed at the antenna feeds are provided as input 410 to the Nu-DFT 450 represented by the W matrix. Applying the Nu-DFT, array factors $A_m$ describing the M beams can be calculated and provided as output 420. These array factors may correspond to what is shown for example in the Schelkunoff's phase domain 300 of FIG. 3.

1.2. Multiple Beam Generation Using Linear Array 1.2.1. Problem Definition

Figure 5:
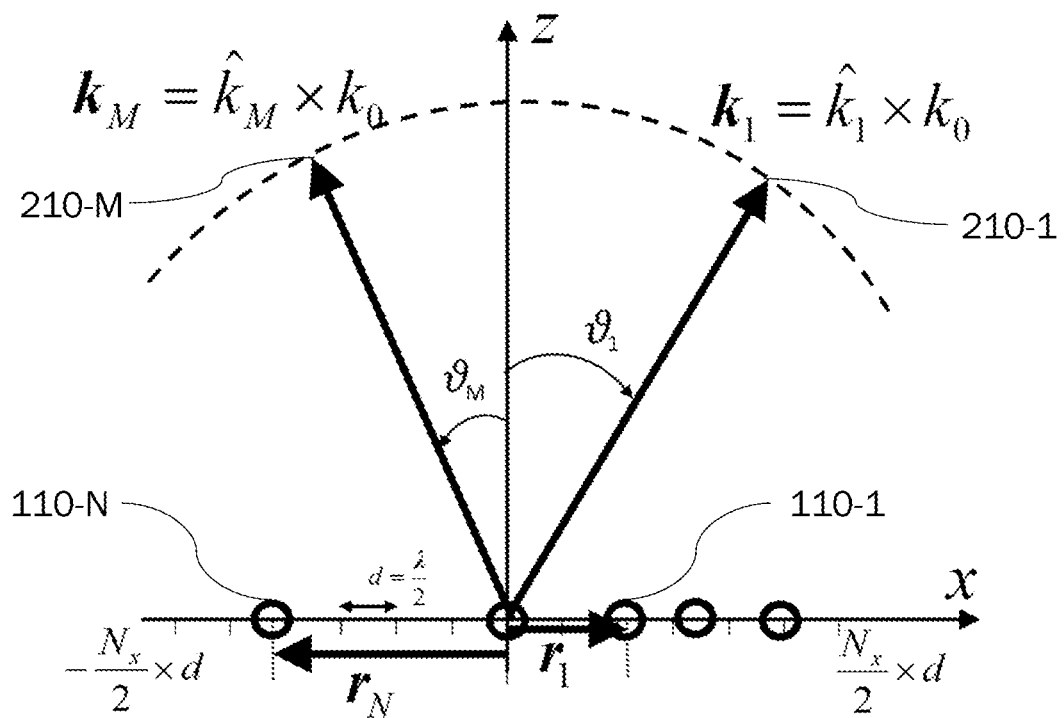
FIG. 5 schematically illustrates an example of antenna elements and beam steering vectors for a linear array antenna.

Without intended limitation, the problem definition given above can be scaled down to a linear array. This simplification may aid the presentation of the mathematical foundations of the architectures and techniques described throughout the present disclosure. An example of antenna elements 110-1, . . . , 110-N and beam steering vectors 210-1, . . . , 210-M for a linear array is shown in FIG. 5, in which circles 110-1, . . . , 110-N indicate the antenna elements placed along the x-axis.

For the linear array, the equations given above can be reformulated as follows, $$w(k_m) = [e^{-jk_m r_1}, e^{-jk_m r_2}, \ldots, e^{-jk_m r_N}]^T = \quad [\text{Eq. 7}]$$
$$[e^{-j(x_1 \psi_m)}, e^{-j(x_2 \psi_m)}, \ldots, e^{-j(x_N \psi_m)}]^T,$$

where $\psi_m = u_m \times \pi$ and $\sin(\vartheta_m)$ for $m=1, \ldots, M$.

Defining $$v(\hat{k}) = \begin{bmatrix} v_1(\hat{k}) \\ v_2(\hat{k}) \\ \vdots \\ v_N(\hat{k}) \end{bmatrix} = \begin{bmatrix} e^{-j(x_1 \times \psi(\hat{k}))} \\ e^{-j(x_2 \times \psi(\hat{k}))} \\ \vdots \\ e^{-j(x_N \times \psi(\hat{k}))} \end{bmatrix}, \quad [\text{Eq. 8}]$$

the array factors of these M beams (i.e., $A_m(\psi)$ for $m=1, \ldots, M$) can be formulated as $$A = \begin{bmatrix} A_1(\psi) \\ A_2(\psi) \\ \vdots \\ A_M(\psi) \end{bmatrix} = \underbrace{\begin{bmatrix} w(k_1)^T \\ w(k_2)^T \\ \vdots \\ w(k_M)^T \end{bmatrix}}_{w} w \times v(\hat{k}) = W \times v(\hat{k}). \quad [\text{Eq. 9}]$$

Figure 6:
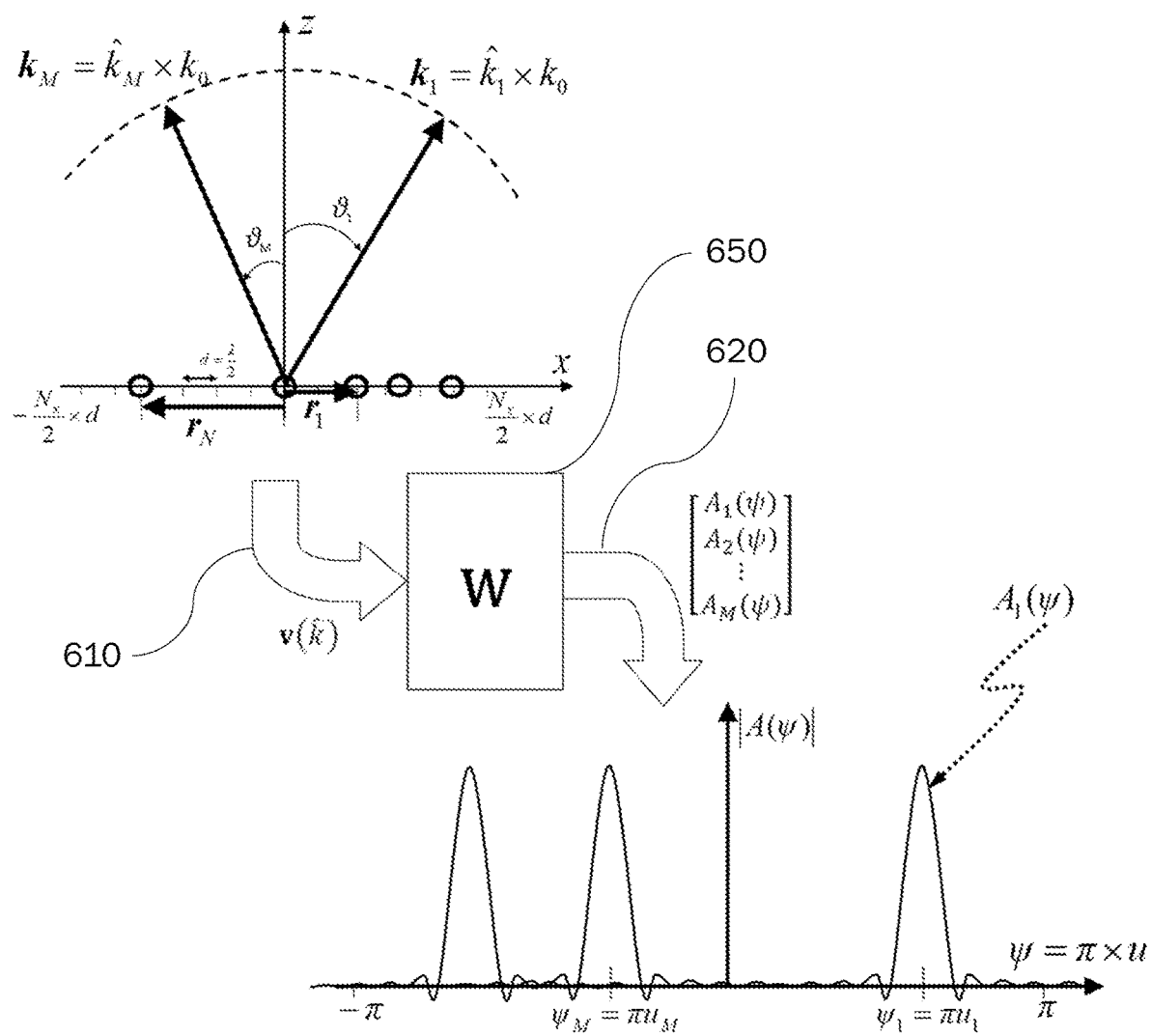
FIG. 6 schematically illustrates an example of using a non-uniform discrete Fourier transform for generating multiple beams by processing the signals arriving from multiple antenna elements of the linear array antenna.

The W matrix, defined in [Eq. 9], is the Nu-DFT matrix, which can be used for the generation of multiple simultaneous beams in a BFN. The concept of beamforming using the W matrix is presented in FIG. 4 for planar arrays and in FIG. 6 for linear arrays. Here in FIG. 6, an arrangement of N antenna elements in a linear antenna array and M beam steering vectors as shown for example in FIG. 5 can be assumed. The signals v($\hat{k}$) observed at the antenna feeds are provided as input 610 to the Nu-DFT 650. Applying the Nu-DFT, array factors $A_m$ describing the M beams can be calculated and provided as output 620.

1.2.2. Problem Formulation

Based on the content presented in the previous sections, the notation and formulation of the Nu-DFT operation for generating multiple simultaneous beams for a linear array are summarized as follows $$A_m = \sum_{n=0}^{N-1} v_n \times e^{-jx_n \psi_m}, \quad [\text{Eq. 9a}]$$

where $$x_n \varepsilon \left[ -\frac{N_x}{2}, \frac{N_x}{2} \right)$$

(position of the $n^{th}$ element);

$\psi_m \in [-\pi, \pi)$ (Schelkunoff Phase corresponding to the m-th beam);

$n=1, \ldots, N$ (element number);

$m=1, \ldots, M$ (beam index);

$v_n$ (input signal received at the $n^{th}$ antenna element. Note that if it is intended to obtain the Array Factor of the beam, this term can be replaced with the omnidirectional pattern of the $n^{th}$ antenna element); and $A_m$ (response at the m-th output of the beamformer corresponding to the m-th beam. If it is intended to obtain the Array Factor of the m-th beam, $A_m$ will be the array factor of the m-th beam in the direction of the angle of arrival ($\vartheta$) of the signal transmitted/received).

Figure 7A:
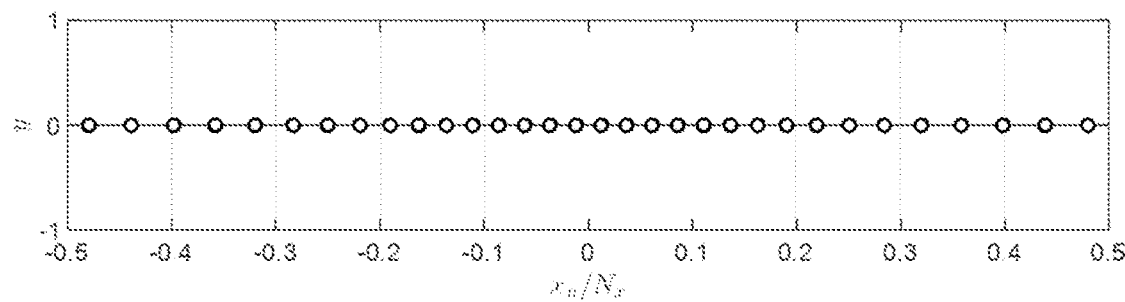
FIG. 7A and FIG. 7B schematically illustrate examples of non-equispaced antenna locations and array factors, respectively, for the linear array antenna.
Figure 7B:
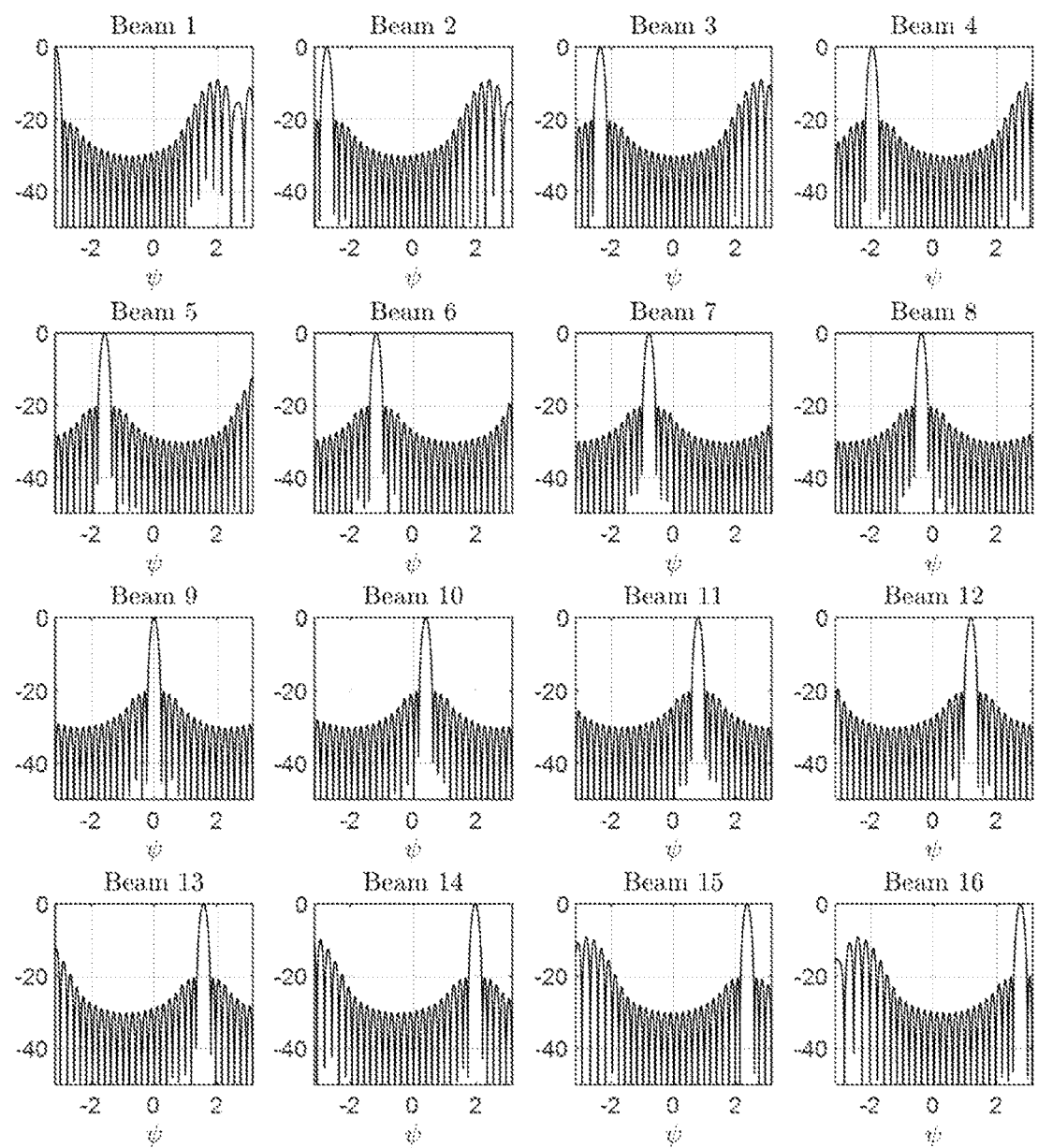

An example simulation scenario for presenting the concept of using the Nu-DFT to generate multiple beams is illustrated in FIG. 7A and FIG. 7B. Here, a special case is assumed in which N=32 non-equispaced antenna locations (see FIG. 7A) are selected, but the M=16 beam locations of corresponding array factors in the $\psi$ domain (see FIG. 7B) are uniform. These M beams may be created using the Nu-DFT operation as defined in [Eq. 9a].

It is to be noted that the present problem formulation relates to a situation in which antenna signals received from N antenna elements are received as an input and are processed to create M beams. As such, the present problem formulation relates to a receive mode in which a plurality of input signals relating to N antenna signals are received at respective antenna elements of an array antenna, and a plurality of output signals relating to M beam signals corresponding to respective antenna beams of the array antenna are generated.

However, the present disclosure shall not be construed as being limited to the receive mode, but also relates to a transmit mode. In the transmit mode, the plurality of input signals relate to N beam signals corresponding to respective antenna beams to be transmitted by the array antenna, and the plurality of output signals relate to M antenna signals for exciting respective antenna elements of the array antenna. Therein, it is to be noted that parameter N is defined with respect to the input-side of the digital BFN (regardless of whether it relates to antenna elements or beams), and that the parameter M is defined with respect to the output-side of the digital BFN. Analogous or similar statements apply to the other parameters and functions defined throughout the disclosure.

Figure 8:
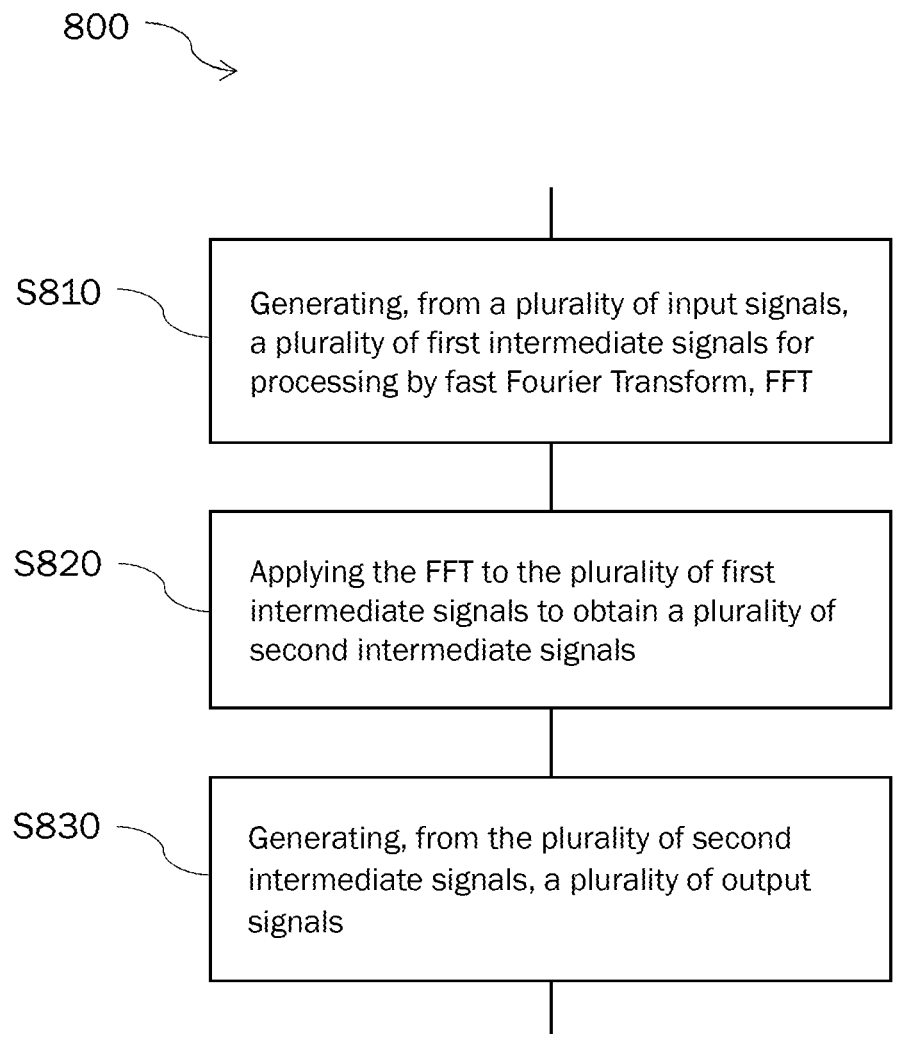
FIG. 8 is a flowchart illustrating an example of a beamforming method according to embodiments of the disclosure.

As such, any methods described throughout the disclosure (e.g., in the context of method 800 described below with reference to FIG. 8) may be a method of transforming the plurality of antenna signals received at respective antenna elements of the array antenna to a plurality of beam signals corresponding to respective antenna beams in the receive mode, or a method of transforming the plurality of beam signals to the plurality of antenna signals in the transmit mode.

2. Using R-DBFN to Generate Multiple Beams

In this disclosure, we present a beamforming approach and its associated implementation steps, which can be reconfigured to support non-uniform antenna elements and/or non-uniform beam pointing directions. This structure may be called "Reconfigurable Digital Beamforming Network (R-DBFN)." It is capable of generating multiple beams at any spatial angle of choice using a non-uniform or uniform array of antenna elements.

The R-DBFN may be realized in six different forms (three for transmit and three for receive modes of operation) for beamforming purposes depending on the kind/type of the non-uniformity experienced at the input and/or the output of the processor. Table 1 shows the name convention of these six types.

TABLE 1

|  | Transmit Beamforming | Receive Beamforming |
| --- | --- | --- |
| Non-Uniform Inputs/ Uniform Outputs | Non-Uniform Beams/ Uniform Elements (NB-UE) | Non-Uniform Elements/ Uniform Beams (NE-UB) |
| Uniform Inputs/Non-Uniform Outputs | Uniform Beams/Non-Uniform Elements (UB-NE) | Uniform Elements/Non-Uniform Beams (UE-NB) |
| Non-Uniform Inputs/ Non-Uniform Outputs | Non-Uniform Beams/Non-Uniform Elements (NB-NE) | Non-Uniform Elements/ Non-Uniform Beams (NE-NB) |

In this disclosure, we will give examples from receive beamforming to detail the operations of the proposed R-DBFN, where necessary. However, it should be noted that the extension of this to transmit beamforming is straightforward with appropriate rearrangements of inputs and outputs of the processor as needed. It will be described below in Section 3 how the proposed processor can be configured to support different types of R-DBFN including observations from their fixed-point implementations.

2.1. Algorithmic Implementation of the R-DBFN

This realization can be generally applied to beamforming techniques for transforming a plurality of N input signals (e.g., received at N input ports) to a plurality of M output signals (e.g., for output at M output signal ports). An example of a corresponding method 800 (e.g., beamforming method) of transforming a plurality of input signals received at N input signal ports to a plurality of output signals for output at M output signal ports is illustrated in the flowchart of FIG. 8. Therein, it is understood that the N input signal ports are non-uniformly distributed with respect to the input ports of the FFT in a first signal domain, which is a signal domain of the input ports of the FFT, and/or that the M output signal ports are non-uniformly distributed with respect to the output ports of the FFT in a second signal domain, which is a signal domain of the output ports of the FFT.

Here, a signal domain may be one of a time domain and a frequency domain, or one of a space domain and a wavenumber domain. The second signal domain may be the dual Fourier transform domain of the first signal domain (and vice versa). Each input signal port and each input port of the FFT may be associated with a respective parameter value (e.g., a space coordinate value or wavenumber value) in the first signal domain. Further, each output signal port and each output port of the FFT may be associated with a respective parameter value (e.g., wavenumber value or space coordinate value) in the second signal domain. Depending on the distribution of the input signal ports with respect to the input ports of the FFT, one or more of the first intermediate signals may be zero. Likewise, depending on the distribution of the output signal ports with respect to the output ports of the FFT, one or more of the second intermediate signals may be disregarded in the below when determining the output signals.

At step S810, a plurality of first intermediate signals for processing by a fast Fourier transform, FFT, is generated from the plurality of input signals (e.g., N input signals). It is understood that the FFT is an oversized FFT and has a predefined number of input ports and output ports corresponding to a size of the FFT operation. This step may be referred to as a preprocessor step, or as preprocessing. It may be performed by a preprocessor module, such as the preprocessor 1310 described below. It is understood that any statements made below with respect to the preprocessor 1310 likewise apply to step S810 (and vice versa).

At step S820, the FFT is applied to the plurality of first intermediate signals to obtain a plurality of second intermediate signals. It is understood that the number of first intermediate signals and second intermediate signals may correspond to the size of the FFT. This step may be referred to as a FFT step. It may be performed by a FFT module, such as the FFT 1350 described below. It is understood that any statements made below with respect to the FFT 1350 likewise apply to step S820 (and vice versa).

At step S830, the plurality of output signals (e.g., M output signals) is generated from the plurality of second intermediate signals. This step may be referred to as a postprocessor step, or as postprocessing. It may be performed by a postprocessor module, such as the postprocessor 1320 described below. It is understood that any statements made below with respect to the postprocessor 1320 likewise apply to step S830 (and vice versa).

If relating to the receive mode, method 800 may further comprise steps of receiving the plurality of N input signals from respective antenna elements of the array antenna and outputting the plurality of output signals as the beam signals. On the other hand, if relating to the transmit mode, method 800 may further comprise a step of outputting the plurality of output signals for transmission by the antenna elements of the array antenna.

Details and possible implementations of the steps of method 800 will be described below. Reference is also made to the description of the corresponding digital beamforming processor or R-DBFN.

Accordingly, it is to be understood that the present disclosure likewise relates to a corresponding BFN for transforming a plurality of input signals to a plurality of output signals. Examples of such BFN will be described below. In general, such BFN may comprise a plurality of N input signal ports for receiving the input signals and a plurality of M output signal ports for outputting the output signals. The BFN may further comprise a preprocessor module, an FFT module, and a postprocessor module. The FFT may have a predefined number of input ports and output ports corresponding to a size of the FFT. The preprocessor module may be configured for generating, from the plurality of input signals, a plurality of first intermediate signals for processing by a fast Fourier transform, FFT (e.g., may be configured for performing step S810 of method 800). The FFT module may be configured for applying the FFT to the plurality of first intermediate signals to obtain a plurality of second intermediate signals (e.g., may be configured for performing step S820 of method 800). The postprocessor module may be configured for generating, from the plurality of second intermediate signals, the plurality of output signals (e.g., may be configured for performing step S830 of method 800). Also here, it is understood that the N input signal ports may be non-uniformly distributed with respect to the input ports of the FFT in the first signal domain and/or that the M output signal ports may be non-uniformly distributed with respect to the output ports of the FFT in the second signal domain.

2.2. Window Functions and their Inverse

To translate the input signals to the inputs of the oversized FFT (e.g., first intermediate signals) and/or to translate the outputs of the FFT (e.g., second intermediate signals) to the output signals, window functions must be chosen. Without intended limitation, in this section the Backward Kaiser-Bessel window is described for this purpose. While simulations have shown that this windowing function achieves better performance in the Mean Square Error (MSE) sense than its alternatives, it is understood that the present disclosure shall not be limited to the using the Backward Kaiser-Bessel window, and that other window functions could be chosen depending on circumstances. In particular, it is noted that different window functions could be used on the input and output sides of the FFT.

Building on the Fourier Transform of the Kaiser Bessel window, the window function to be implemented within the R-DBFN can be defined as follows $$\varphi(\rho) = \frac{1}{I_0(K\alpha)} \times \frac{\sinh\left(\alpha\sqrt{K^2 - \rho^2}\right)}{\pi\sqrt{K^2 - \rho^2}} \quad [\text{Eq. 10}]$$

for $|\rho| \leq K$. Here, $$\alpha = \pi\left(2 - \frac{1}{c}\right) - 0.1$$

(see [Fourmont]), the window size is 2K+1 and c is the oversizing ratio.

It is understood that such window function may be defined both for an input-side of the FFT for preprocessing (e.g., as $\varphi^{(pre)}$) and an output-side of the FFT for postprocessing (e.g., as $\varphi^{(pos)}$). The window functions determine (first) weight factors that need to be applied to the input signals for translating between the potentially non-uniformly distributed input signal ports and the input ports of the oversized FFT, and (second) weight factors that need to be applied to the outputs of the FFT to translate between the output ports of the FFT and the potentially non-uniformly distributed output signal ports. Also the oversizing factor c may be defined for both sides of the FFT (e.g., as $c_1$ and $c_2$) as the ratio of the size of the FFT and the number of input signals/output signals. Further, also the factor 2K+1 may be defined both for the input-side and the output-side (e.g., as $2K_1+1$ and $2K_2+1$). These factors determine the number of input signals or outputs from the FFT over which the respective window functions will span (e.g., the window size).

In general, the shape of the window function on the input side, for a given input signal port, may depend on a location of that input signal port in the first signal domain. Further, the shape of the window function on the output side, for a given output signal port, may depend on a location of that output signal port, for example in the second signal domain. Shapes may further depend on the oversizing ratios and/or window sizes. Shapes may further depend on a degree of alignment (e.g., a distance in the signal domain) between a respective input signal port and the closest input port of the FFT, or a degree of alignment (e.g., a distance in the signal domain) between a respective output signal port and the closest output port of the FFT.

The inverse of the window function is intended to remove distortions introduced by the window function of choice. That is, applying the input-side window functions (i.e., applying weight factors determined by the input-side) may require applying factors derived from the inverse function at the output-side to remove any distortions introduced by the output-side window function. Conversely, applying the output-side window functions (i.e., applying weights determined by the output-side window function) may require applying factors derived from the inverse function at the input-side to remove any distortions introduced by the input-side window function. As such, the input-side weights may be based on the input-side window function and optionally the input-side inverse function (which depends on the output-side window function), and the output-side weights may be based on the output-side window function and optionally the output-side inverse function (which depends on the input-side window function). It is also to be noted that in some cases applying the window function on either side of the FFT may not be necessary (e.g., for uniform input or output), which would then allow to omit applying the inverse function at the respective other side of the FFT.

The corresponding inverse function of the Fourier Transform of the window function (selected in [Eq. 10]) is $$\hat{\varphi}(\xi) = \frac{I_0(K\alpha)}{I_0\left(K\sqrt{\alpha^2 - \left(\frac{\xi}{c}\right)^2}\right)} \quad \text{for } \xi \in [-\pi, \pi).$$

In order to have the same grid range of $N_x$ for the inverse of the window function, this definition can be updated to $$\hat{\varphi}_{cN_x}(s) = \frac{I_0(K\alpha)}{I_0\left(K\sqrt{\alpha^2 - \left(\frac{2\pi s}{cN_x}\right)^2}\right)} \quad [\text{Eq. 11}]$$

for $s \in \left[-\frac{N_x}{2}, \frac{N_x}{2}\right)$.

Figure 9:
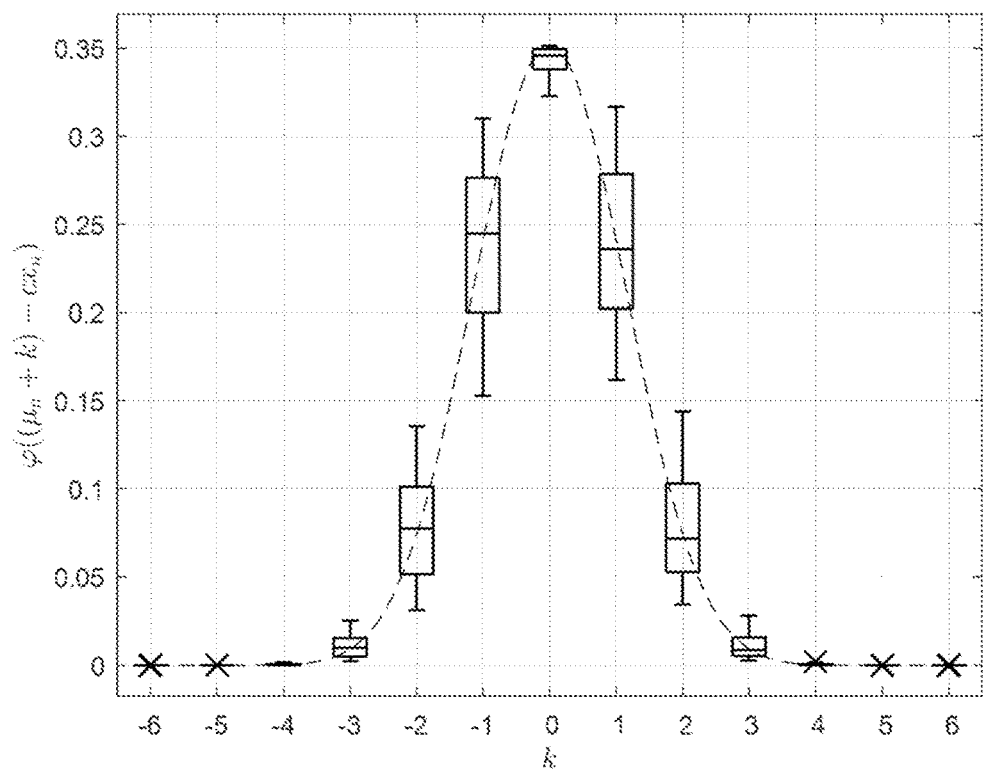
FIG. 9 is a diagram illustrating an example of a coefficient range distribution of a window function (e.g., convolution function) that can be used in beamforming methods according to embodiment of the disclosure.
Figure 10:
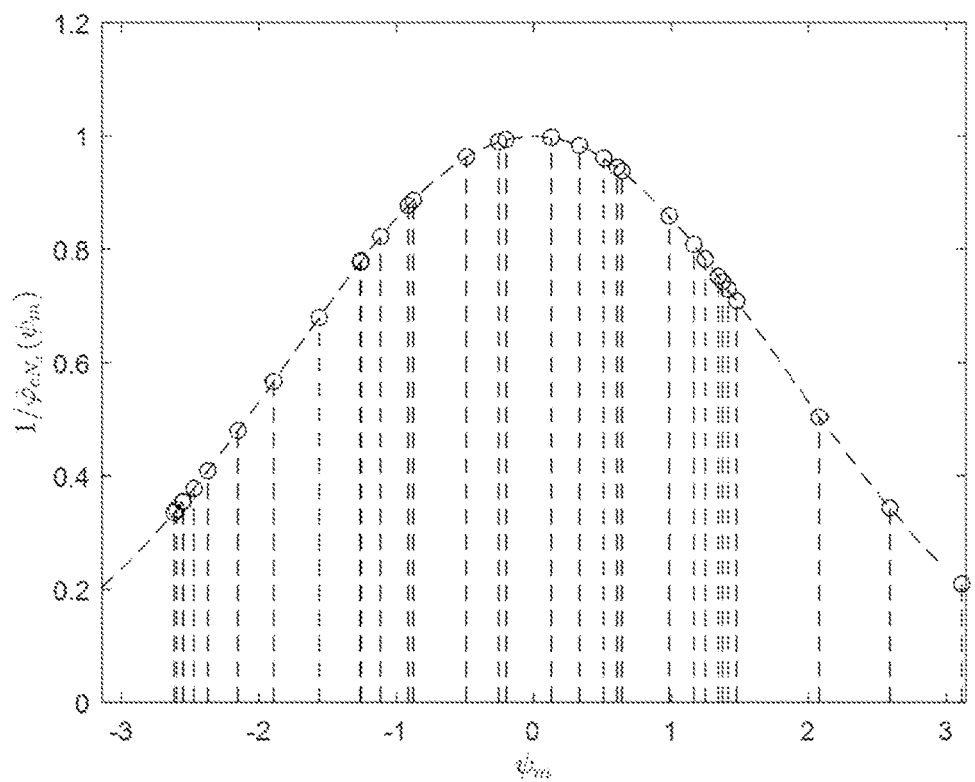
FIG. 10 is a diagram illustrating an example of a coefficient distribution of an inverse of a window function (e.g., scaling function) in a primary interval that can be used in beamforming methods according to embodiment of the disclosure.

Example: An example use of the window function and its inverse function is illustrated in FIG. 9 (coefficient range distribution of the window function for a given set of non-uniform signals) and FIG. 10 (Coefficient distribution of the inverse function in the primary interval) for an arbitrary set of input signals, where N=32 and K=6. For the window function, ρ is the difference (in the oversized grid of $cN_x$) between the non-uniform input signal and the nearest input port of the oversized FFT, and $$\varphi((\mu_n + k) - cx_n) = \frac{1}{I_0(K\alpha)} \times \frac{\sinh\left(\alpha\sqrt{K^2 - ((\mu_n + k) - cx_n)^2}\right)}{\pi\sqrt{K^2 - ((\mu_n + k) - cx_n)^2}} \quad \text{[Eq. 12]}$$

Here, the distance ρ may be given in the signal domain of the input ports of the FFT.

$$\text{for } x_n \in \left[-\frac{N_x}{2}, \frac{N_x}{2}\right)$$
$$k = -K, \ldots, K$$

$\mu_n$ is the nearest integer to $cx_n$.

The corresponding inverse function $\hat{\varphi}_{cN_x}(\psi_m)$, can also be evaluated at non-uniform points in the range $[-\pi, \pi)$ using the equation given in [Eq. 11].

Figure 11:
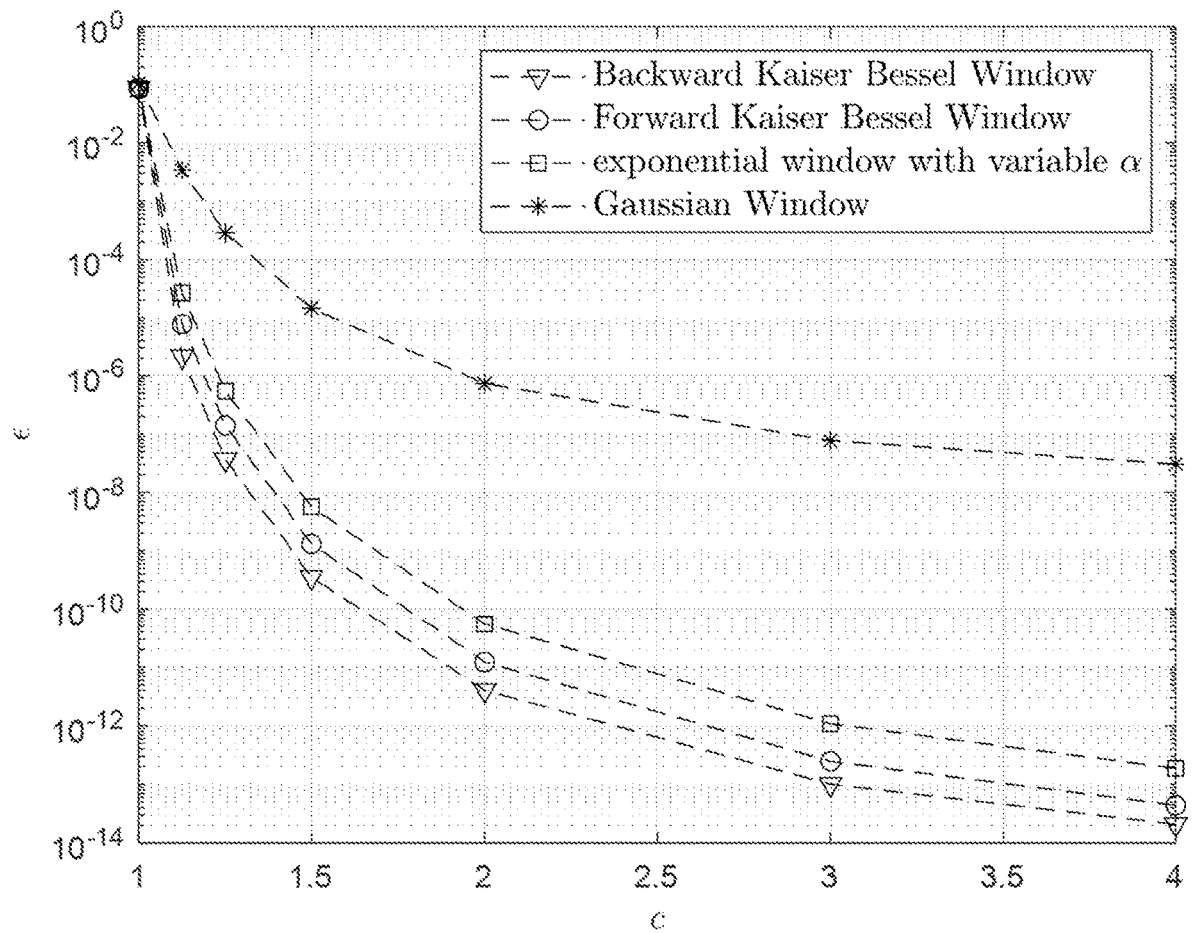
FIG. 11 is a diagram illustrating an example of simulation results for different window functions that can be used in beamforming methods according to embodiment of the disclosure.

As noted above, it is also possible to use window functions other than Backward Kaiser-Bessel. Several alternatives were tested. FIG. 11 shows simulation results in the Mean Squared Error (MSE) sense for four different window functions for different values of c (for K=6, N=64, M=N/2). As can be seen, the Backward Kaiser-Bessel window achieves a lower MSE than the other window functions. Nevertheless, the present disclosure shall not be construed as being limited to using the Backward Kaiser-Bessel window, and other window functions may be used as well, depending on circumstances.

3. Digital Processor Implementation of the Reconfigurable DBFN

Figure 12:
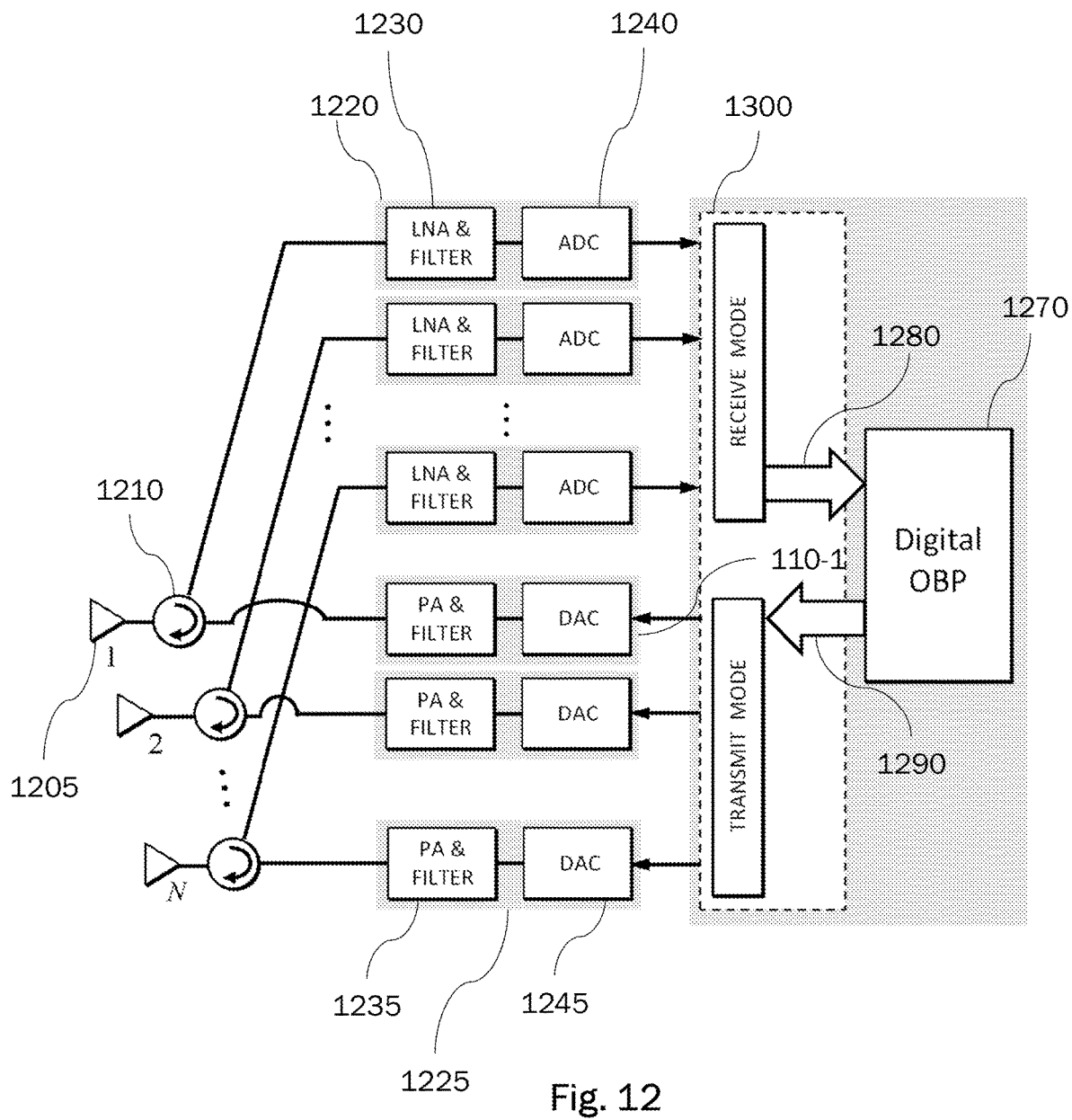
FIG. 12 schematically illustrates an example of a digital BFN according to embodiments of the disclosure.

Next, a processing structure for simultaneous generation of multiple beams will be described using the R-DBFN. An example of a high level diagram of the proposed implementation is shown in FIG. 12. The BFN shown therein is composed of three stages of operations: (1) Receive Beamforming, (2) Transmit Beamforming, and (3) Digital On-Board Processing (OBP) to deliver the signal processing operations associated with transparent and regenerative communication units. The R-DBFN processing scheme can perform both receive and transmit modes of operations configured by switching between FFT and inverse FFT (IFFT) or alternatively re-defining the axis where the non-uniform samples are collected.

In the example of FIG. 12, the BFN comprises N antenna ports 1205 respectively coupled to switches 1210 so that the same antenna array can be used for both transmit and receive modes of operations. In an alternative embodiment, it is also possible to use separate transmit and receive antenna arrays, with their antenna elements supporting either transmit or receive modes of operations for telecommunication purposes. Respective receive signal processing chains (receive signal conditioning chains) 1220 may each comprise a Low Noise Amplifier (LNA), analog filters 1230, and a Radio Frequency Analog-to-Digital Converter (RF ADC) 1240. Respective transmit signal processing chains (transmit signal conditioning chains) 1225 may each comprise an RF Digital-to-Analog Converter (RF DAC) 1245, a Power Amplifier (PA) and analog filters 1235. With the use of RF ADCs and RF DACs, in FIG. 12, direct ADC down-conversion and direct DAC up-conversion are implemented to benefit from the reduction in the number of components in the receive and transmit signaling chains. However, it is also possible to accommodate mixing stages for frequency up-conversion and down-conversion, so that digital converters, operating at lower clock rates may be employed. This option necessitates additional analogue signal processing units including additional analog filters. The BFN in FIG. 12 further comprises an R-DBFN processor 1300 that can work both in receive and transmit mode, as well as a digital OBP 1270. In receive mode, a plurality of beams are generated by the R-DBFN and transferred, 1280, to the digital OBP 1270, whereas in the transmit mode operations, a plurality of beams are transferred, 1290, from the digital OBP to the R-DBFN so that the antenna signals can be generated by the transmit mode operations of the R-DBFN 1300.

The implementation of the R-DBFN necessitates:
R-DBFN Preprocessor;
Oversized FFT unit; and
R-DBFN Postprocessor.

Figure 13:
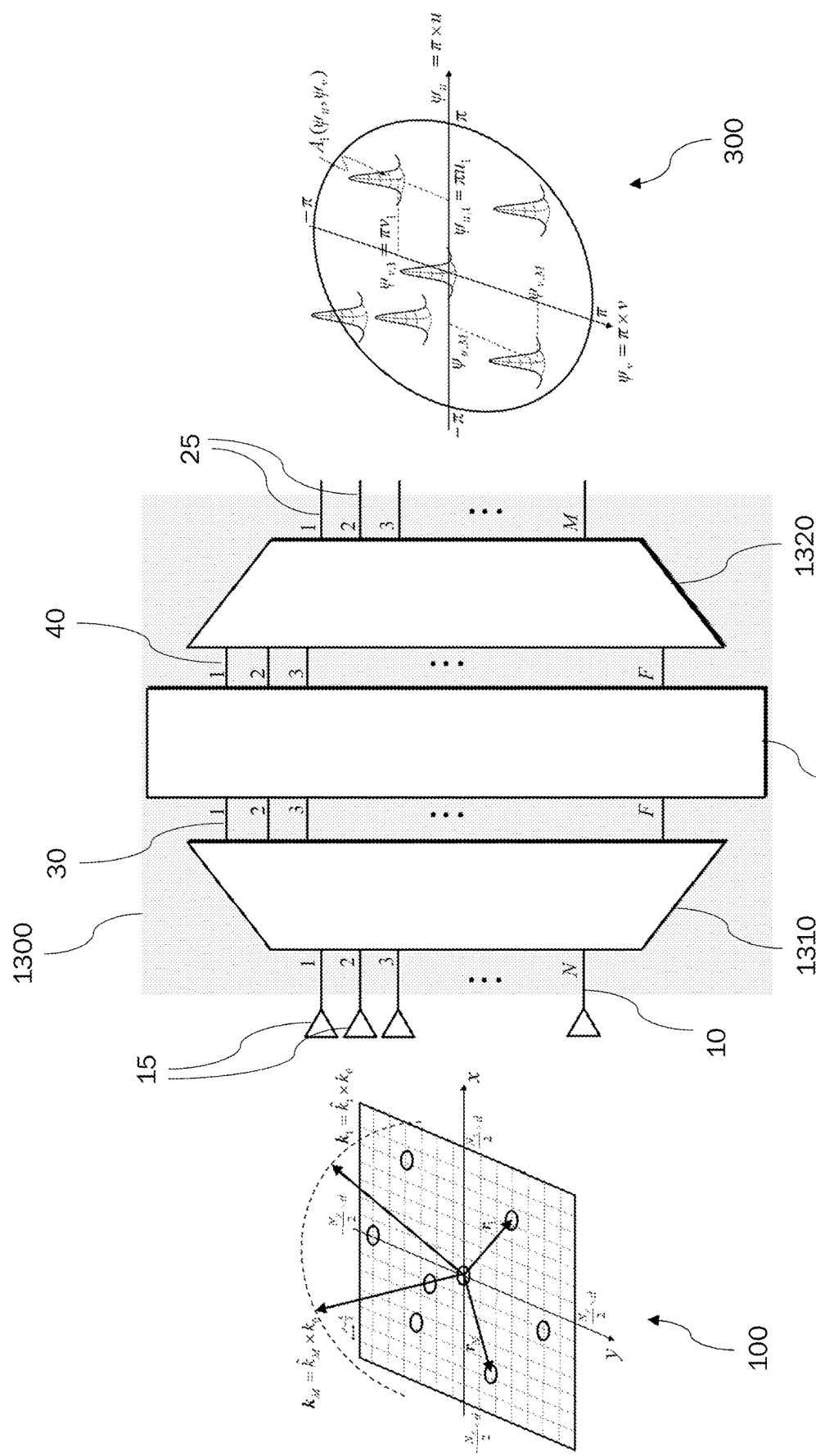
FIG. 13 illustrates an example of a digital beamforming processor in the digital BFN of FIG. 12 according to embodiments of the disclosure.

This is shown in FIG. 13, which illustrates a more detailed view of an example of the R-DBFN processor 1300. The R-DBFN processor 1300 can receive N input signals 10 from N input signal ports 15 and outputs M output signals 25 at M output signal ports. The input signals 10 may correspond to signals received at antenna feeds of an array antenna 100, for example. The output signals 25 may correspond to array factors in the phase plane 300, for example.

The R-DBFN processor 1300 comprises a R-DBFN preprocessor (preprocessor module) 1310, an oversized FFT (FFT module) 1350, and a R-DBFN post processor (postprocessor module) 1320. The R-DBFN preprocessor 1310 outputs first intermediate signals 30, derived from the input signals 10, for processing by the oversized FFT 1350. The oversized FFT 1350 outputs second intermediate signals 40 for processing by the R-DBFN post processor 1320, which in turn generates the output signals 25.

It should be noted that regardless of the type of beamforming used (see Table 1), the digital implementation may always be formed based on these three processing units. Therefore, a unified definition of the DBFN for all six beamforming types, listed in Table 1, will be presented here, without intended limitation.

In the remainder of this section, details of the preprocessor and the postprocessor for the non-uniform input and non-uniform output will be provided. Additionally, it will be explained how the system can be configured to work with uniform input and/or uniform output. For reasons of simplicity of presentation of the underling concept, without intended limitation, reference will be made to the case of receive beamforming, considering a linear antenna array. It is understood that the presentation given here can be easily extended to the transmit case and/or to antenna arrays of higher dimensions.

To realize the preprocessor and the postprocessor, two sets of weight factors should be obtained considering the non-uniform distribution of the input and the non-uniform distribution of the output ports of the processor. These weight factors can be extracted from the window functions of choice and their inverse functions.

Figure 14A:
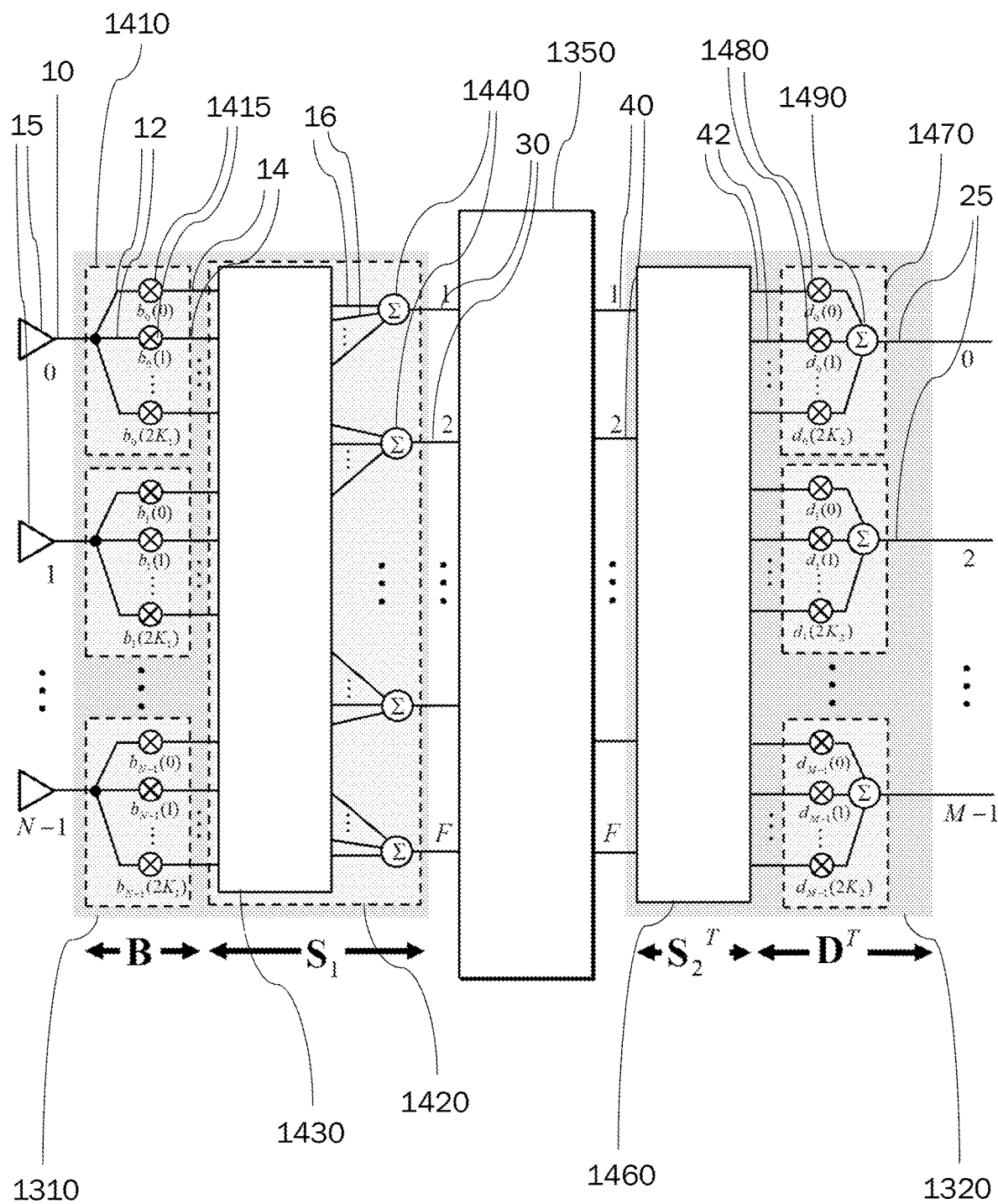
FIG. 14A schematically illustrates an example of the internal structure of a preprocessor and a postprocessor in the digital beamforming processor of FIG. 13 according to embodiments of the disclosure.

FIG. 14A illustrates an example of the internal structure of the preprocessor 1310 and the postprocessor 1320, as well as how the use of the aforementioned weight factors are distributed within this structure.

The preprocessor 1310 comprises a plurality of N weighting units (weighting blocks or modules) 1410, one for each input signal port 15 (i.e., one for each input signal), and a mapping unit (mapping block, or routing unit/block/module) 1420. Each weighting unit 1410 comprises $2K_1+1$ multipliers 1415 that apply respective (first) weight factors $b_n=[b_n$ $(0), \ldots, b_n(2K_1)]^T$, where $n=0, \ldots N-1$, to identical versions 12 of the n-th input signal 10. The factor $2K_1+1$ represents a first predetermined number; the weight factors $b_n$ may also be referred to as scaling factors or weight factors. The weighted signals 14 thus obtained are provided to the mapping unit 1420. The mapping unit 1420 comprises a switch matrix (e.g., (re-)configurable switch matrix) 1430 and a plurality of summation units (summation blocks/modules) or adders 1440, one for each input port of the FFT 1350. The weighted signals 14 are mapped (routed) by the switch matrix 1430 to respective inputs of the FFT 1350. In this sense, the switch matrix 1430 links the input signal ports and the input ports of the FFT 1350. There, weighted signals that are routed to the same input port of the FFT 1350 are summed/added by the respective adder 1440 for this input port of the FFT 1350. By this summation, respective first intermediate signals 30 are generated, one for each input port of the FFT 1350, for processing by the FFT 1350.

As noted above, the FFT 1350 acts on the first intermediate signals 30 and thereby generates second intermediate signals 40 that are provided at respective output ports of the FFT 1350.

The postprocessor 1320 comprises a switch matrix (e.g., (re-)configurable switch matrix) 1460, as well as a plurality of M weighting units (weighting blocks or modules) 1470, one for each output signal port. The switch matrix 1460 links the output ports of the FFT and the output signal ports. Each weighting unit 1470 comprises $2K_2+1$ multipliers 1480, as well as a summation unit (summation block/module) or adder 1490. For each weighting unit 1470, the $2K_2+1$ multipliers 1480 apply respective (second) weight factors $d_m=[d_m(0), \ldots, d_m(2K_2)]^T$ to those signals 42 that are mapped to the respective output signal port. The weighted signals are then summed by the summation unit 1490 of that weighting unit 1470 to generate a respective output signal 25.

As described above, the preprocessor 1310 generates the first intermediate signals 30 for input to the FFT 1350 from the N input signals 10. In general, generating the first intermediate signals 30 (e.g., at step S810 of method 800) may involve routing, between input signal ports 15 and input ports of the FFT, and scaling of input signals 10 in accordance with their positions in the first signal domain and/or a distance relationship between respective input signal ports 15 and input ports of the FFT in the first signal domain, and summing scaled signals 16 from different input signal ports 15 routed to the same input ports of the FFT. The routing may be performed by the mapping unit 1420, more particularly, by the reconfigurable switch matrix 1430. The scaling may be performed by the weighting units 1410. The summing of the scaled signals may be performed by the summation units 1440. In other words, generating the first intermediate signals 30 may be said to amount to interconnecting the input signal ports 15 and input ports of the FFT 1350 based on respective distances between ports in the first signal domain, while applying respective scaling factors to the interconnections.

In general, the first intermediate signals 30 may be generated based on linear combinations 10 of the input signals. The weight factors in this linear combination may depend on respective positions of the input signal ports 15 in the first signal domain and/or a distance relationship between respective input signal ports 15 and input ports of the FFT 1350 in the first signal domain. Said weight factors may further depend on the oversizing ratio $c_i$ between the number of input ports of the FFT 1350 and the number N of input signal ports.

It is to be noted that the order of weighting, routing/mapping, and summing in the preprocessor 1310 may deviate from the order shown in the example of FIG. 14A. Accordingly, routing (e.g., mapping) and scaling of the input signals (for example at step S810 of method 800) may involve scaling the input signals 10 and routing the scaled input signals 16 to input ports of the FFT 1350, or routing the input signals 10 to input ports of the FFT 1350 and scaling the routed input signals prior to summing and input to the FFT 1350.

Therein, the number of multipliers 1415 connected to an adder 1440 may not necessarily be fixed for some implementations of the preprocessor 1310. In one example, there could be only one or two multipliers 1415 (or maybe even none) connected to a particular adder 1440 in the preprocessor 1310, while for another adder 1440 there could be very many multipliers 1415 connected. If the BFN (in particular, the switch matrices 1430, 1460) is not reconfigurable (i.e., beam positions and antenna locations are fixed), connections between the adders 1440 and multipliers 1415 may be hardwired, so that assignment of multipliers 1415 to adders 1440 is straightforward. On the other hand, in a reconfigurable BFN, it may not be fixed beforehand which multiplier 1415 is connected to which adder 1440 in the preprocessor. The number of multipliers 1415 connected to a particular adder 1440 may change as the distribution of the input signals is changed on reconfiguring the BFN. To accommodate for this, either the adders 1440 could be oversized (i.e., have an excess number of inputs), or the number of multipliers 1415 could be increased.

Since multipliers typically are more expensive than (two-input) adders, there may be a preference for the first option which is illustrated in FIG. 14A and which necessitates the switch matrix 1430 to be located between the multipliers 1415 (i.e., weighting units 1410) and the adders 1440. Using the switch matrix 1430, it is determined which multiplier 1415 is connected to which input of the oversized adders 1440. In this case, the order of operations is weight, map/route (switch), and sum in the preprocessor 1310. However, also the second option may be chosen in the context of the present disclosure. In this case, the switch matrix 1430 would need to be arranged before the multipliers 1415. Then, the order of operations would be map/route (switch), weight, and sum in the preprocessor 1310.

The postprocessor 1320 described above generates the M output signals 25 from the second intermediate signals 40. In general, generating the output signals 25 (e.g., at step S830 of method 800) may involve routing, between output ports of the FFT and output signal ports, and scaling of second intermediate signals 40 in accordance with their positions in the second signal domain and/or a distance relationship between respective output ports of the FFT and signal output ports in the second signal domain, and summing scaled signals from different output ports of the FFT routed to the same output signal port. In other words, generating the output signals 25 from the second intermediate signals 40 may be said to amount to interconnecting the output ports of the FFT 1350 and the output signal ports based on respective distances between ports in the second signal domain, while applying respective scaling factors to the interconnections.

In general, the output signals 25 may be generated based on linear combinations of the second intermediate signals 40. The weight factors in this linear combination may depend on respective positions of the output signal ports in the second signal domain and/or a distance relationship between respective output signal ports and output ports of the FFT 1350 in the second signal domain. Said weight factors may further depend on the oversizing ratio $c_2$ between the number of output ports of the FFT 1350 and the number M of output signal ports.

For the postprocessor 1320, the order of routing/mapping, weighting, and summing may always be routing/mapping, weighting, and summing, as shown in the example of FIG. 14A.

Therein, the number of multipliers 1480 connected to an adder 1490 may be fixed for the postprocessor 1320 (i.e., there may always be $2K_2+1$ multipliers 1480 per adder 1490).

As noted above, in embodiments of the disclosure the FFT may be oversized with respect to at least one of the N input signal ports and the M output signal ports with oversizing ratios of the FFT unit from both input and the output sides of the FFT being greater than one.

When the FFT is oversized with respect to the N input signal ports, generating the plurality of first intermediate signals from the plurality of input signals 10 (e.g., at step S810 of method 800) may involve the following. For each input signal 10, respective first weight factors $b_n$ may be applied to each of a first predetermined number $(2K_1+1)$ of identical signals 12 derived from the input signal 10, and the weighted signals 14 may be mapped to respective input ports of the FFT 1350. Alternatively, for each input signal, each of the first predetermined number $(2K_1+1)$ of the identical signals 12 derived from the input signal 10 may be mapped to respective input ports of the FFT 1350, and respective first weight factors $b_n$ may be applied to the mapped signals. In both cases, for each input port of the FFT 1350, the respective weighted signals for this input port may be summed to generate a respective first intermediate signal 30 for input to the FFT 1350.

Further, when the FFT is oversized with respect to the M output signal ports, generating the plurality of output signals from the plurality of second intermediate signals 40 (e.g., at step S830 of method 800) may involve the following. For each output signal port, respective second weight factors $d_m$ may be applied to each of a second predetermined number $(2K_2+1)$ of identical signals derived from the second intermediate signals 40, and the weighted signals may be mapped to the output signal port. Alternatively, for each output signal port, the second predetermined number of second intermediate signals 40 may be mapped to the output signal port, and respective second weight factors $d_m$ may be applied to the mapped signals. In both cases, for each output signal port the respective weighted signals may be summed to generate a respective output signal 25.

The aforementioned (first and second) weight factors may also be referred to as scaling factors. The first and second predetermined numbers $2K_1+1$ and $2K_2+1$ may be identical to each other in some implementations, i.e., $2K_1+1=2K_2+1=2K+1$. As noted above, the weight factors may also depend on the oversizing ratios of the size of the FFT compared to the number of input signal ports or output signal ports, respectively, in addition to the non-uniformities and/or distance relationships.

Notably, while a BFN is described above and in the remainder of the disclosure, the present disclosure likewise relates to an FFT processor comprising such BFN. Also here, the FFT may be oversized with respect to at least one of the N input signal ports and the M output signal ports of the BFN. Further, the plurality of first weight factors and/or second weight factors may be reconfigurable according to the number of N input signal ports and to the number of M output signal ports. Therein, the plurality of first weight factors and/or second weight factors may depend on a function of the amount of the oversizing of the FFT and the distributions of the input signal ports and output signal ports in respective signal domains.

The following subsections provide examples of additional details on the proposed beamformer and its units/blocks/modules/reconfigurability, as well as on how to utilize the aforementioned weight factors throughout the proposed beamformer.

3.1. Obtaining the Weight Factors of the R-DBFN
3.1.1. First Weight Factors

The first weight factors of the preprocessor 1310 may be arranged to form the following matrix $$B = \begin{bmatrix} b_0 & & 0 \\ & \ddots & \\ 0 & & b_{N-1} \end{bmatrix}, \quad [\text{Eq. 13}]$$

where the vector of weight factors of the n-th input signal is $b_n=[b_n(0), \ldots, b_n(2K_1)]^T$, for $n=0, \ldots, N-1$. Here, each vector contains $2K_1+1$ values, and therefore the total number of values implementing the first weight factors of the preprocessor 1310 is $(2K_1+1)N$.

Each $b_n$ vector may be calculated based on
1. the first window function of choice for the preprocessor 1310, the coefficients of which is defined by $$\hat{\varphi}_n^{(pre)}=[\hat{\varphi}_n^{(pre)}(-K_1), \ldots, \hat{\varphi}_n^{(pre)}(0), \ldots, \hat{\varphi}_n^{(pre)}(K_1)]^T \quad [\text{Eq. 15}]$$

for $n=0, \ldots, N-1$. In accordance with [Eq 12], $\varphi_n^{(pre)}(k)= \varphi((\mu_n+k)-c_1x_n)$, where $\mu_n$ is the nearest integer to the value of $c_1x_n$, i.e., $\mu_n=\text{round}(c_1x_n)$, and $k=-K_1, \ldots, K_1$.

2. the distribution of the non-uniform input signal ports. This may be represented by an input configuration vector $\delta(x)=[\delta(x_0), \ldots, \delta(x_{N-1})]$, the values of which should be updated as the position of the input signal ports are changed, where $$\delta(x_n) = \frac{F}{2} + \mu_n, \ a = 1 + \frac{2K_1}{c_1 N_x} \text{ and } F = c_1 c_2 a N_x.$$

3. Optionally, possibly necessitated by the second window function, the coefficient vector of the inverse of the second window function, $$\hat{\varphi}_n^{(pre)}=[\hat{\varphi}_n^{(pre)}(-K_1), \ldots, \hat{\varphi}_n^{(pre)}(0), \ldots, \hat{\varphi}_n^{(pre)}(K_1)]^T \quad [\text{Eq. 16}]$$

the elements of which can be calculated as $\hat{\varphi}_n^{(pre)}(k)=\hat{\varphi}_F(\mu_n+k)$ using for example [Eq. 11].

It should be noted that the superscript $^{(pre)}$ corresponds to the preprocessor 1310, while $^{(pos)}$ corresponds to the postprocessor 1320. The definitions to the first and the second window functions, as well as their inverses, were already detailed in the previous section of this disclosure, to which reference is made for conciseness.

The vector of first weight factors for each input signal port (or input signal) may be calculated as follows $$b_n = \begin{bmatrix} \varphi_n^{(pre)}(-K_1)\hat{\varphi}_n^{(pre)}(-K_1) \\ \varphi_n^{(pre)}(-K_1+1)\hat{\varphi}_n^{(pre)}(-K_1+1) \\ \vdots \\ \varphi_n^{(pre)}(0)\hat{\varphi}_n^{(pre)}(0) \\ \vdots \\ \varphi_n^{(pre)}(K_1)\hat{\varphi}_n^{(pre)}(K_1) \end{bmatrix} \quad [\text{Eq. 17}]$$

to form the matrix shown in [Eq. 13]. On the other hand, the switch matrix $S_1$, for example of size $F \times ((2K_1+1)N)$, is responsible for connecting the multipliers (performing the multiplications with the coefficients of B) with the adders prior to the FFT operation. The configuration of $S_1$ should also be delivered based on $\delta(x)$ as follows $$S_1\{\gamma, \sigma\} = \begin{cases} 1, \text{ if } \gamma = \mod(\delta(x_n)+k, F) \\ \text{ and } \sigma = (2K_1+1)n + K_1 + k \\ 0, \text{ otherwise} \end{cases} \quad [\text{Eq. 18}]$$

by setting individual elements of the matrix to 1 or 0 for $n=0, \ldots, N-1$ and $k=-K_1, \ldots, K_1$ while $\mod(\bullet, *)$ represents the modulus operation with respect to $*$. Here $\{\gamma, \sigma\}$ indicates the values of matrix $S_1$ for row $\gamma$ and column $\sigma$.

Accordingly, the first weight factors $b_n$ (e.g., used at step S810 of method 800) may be determined based on a first window function $\varphi_n^{(pre)}$ spanning the first predetermined number $2K_1+1$ of identical signals derived from each input signal. A shape of the first window function $\varphi_n^{(pre)}$ may depend on a location $\delta(x_n)$ in the first signal domain of a respective input signal port (see, e.g., [Eq. 10]). For example, the shape may depend on a distance, in the first signal domain, from the respective input signal port to a closest one among the input ports of the FFT (see, e.g., [Eq. 12]). Optionally, the first weight factors may further depend on any second window functions applied to second intermediate signals and comprise respective contributions for removing signal distortion resulting from said second window functions being applied. This dependence on the second window function may be expressed via the inverse of the second window function $\hat{\varphi}_n^{(pre)}$.

Further, also the mappings between input signal ports and input ports of the FFT, for example as given by the switch matrix $S_1$ may depend on the locations of the input signal ports in the first signal domain. For example, said mappings may depend on respective distances, in the first signal domain, between the input signal ports and the input ports of the FFT.

3.1.2. Oversized FFT Unit

The FFT processor may need to perform zero padding needed at the input and the output as well as the reordering of the input/output depending on whether Decimation In Time (DIT) or Decimation In Frequency (DIF) FFT is utilized. The length of the FFT may be $c_1 c_2 a N_x$. In some implementations, it is assumed that the size of the FFT is a power of two and therefore most common radices can be utilized to deliver the FFT operation. The matrix representing the said Fourier Transform is formulated below 3.1.3. Second Weight Factors Similar to matrix B 1310, the second weight factors of the postprocessor can be collected in a matrix as follows $$D = \begin{bmatrix} d_0 & & 0 \\ & \ddots & \\ 0 & & d_{M-1} \end{bmatrix} \quad [\text{Eq. 20}]$$

where the vector weight factors of the m-th output is $d_m = [d_m(0), \ldots, d_m(2K_2)]^T$ for $m=0, \ldots, M-1$, and each vector is formed of $2K_2+1$ values. Therefore, the total number of values implementing the second weight factors of the postprocessor is $(2K_2+1)M$.

Each $d_m$ vector may be calculated based on
1. the second window function of choice for the postprocessor, the coefficients of which is defined by $$\varphi_m^{(pos)} = [\varphi_m^{(pos)}(-K_2), \ldots, \varphi_m^{(pos)}(0), \ldots, \varphi_m^{(pos)}(K_2)]^T \quad [\text{Eq. 21}]$$

for $m=0, \ldots, M-1$. In accordance with [Eq 12], $\varphi_m^{(pos)}(k) = \varphi((\eta_m + k) - ac_2 s_m)$, where $\eta_m$ is the nearest integer to the value of $ac_2 s_m$, i.e., $\eta_m = \text{round}(ac_2 s_m)$, and $k=-K_2, \ldots, K_2$.
2. the distribution of the non-uniform output signal ports. This may be represented by an output configuration vector $$\delta(s) = [\delta(s_0), \ldots, \delta(s_{M-1})] \quad [\text{Eq. 22}]$$

the values of which should be updated as the position of the output signal ports are changed and $$\delta(s_m) = \frac{F}{2} + \eta_m.$$

3. Optionally, possibly necessitated by the second window function, the coefficients of the inverse of the first window function $\hat{\varphi}_m^{(pos)} = \hat{\varphi}_{c_1 N_x}(s_m)$ using for example [Eq. 11].

The vector of second weight factors for each output signal port (or output signal) may be calculated as follows $$d_m = \hat{\varphi}_m^{(pos)} \varphi_m^{(pos)} \quad [\text{Eq. 23}]$$

to form the matrix shown in [Eq. 20]. On the other hand, the switch matrix $S_2$, for example of size $F \times ((2K_2+1)M)$ is responsible for connecting the output ports of the FFT unit with the multipliers (performing the multiplications with the coefficients of D). The configuration of $S_2$ should also be delivered based on $\delta(s)$ as follows $$W = \begin{bmatrix} e^{-j\frac{2\pi \times \left(\frac{F}{2}\right)}{F} \times \frac{F}{2}} & \cdots & e^{-j\frac{2\pi \times (F-1)}{F} \times \frac{F}{2}} & e^{-j\frac{2\pi \times 0}{F} \times \frac{F}{2}} & e^{-j\frac{2\pi \times 1}{F} \times \frac{F}{2}} & \cdots & e^{-j\frac{2\pi \times \left(\frac{F}{2}-1\right)}{F} \times \frac{F}{2}} \\ \vdots & \ddots & \vdots & \vdots & \vdots & \ddots & \vdots \\ e^{-j\frac{2\pi \times \frac{F}{2}}{F} \times (F-1)} & \cdots & e^{-j\frac{2\pi \times (F-1)}{F} \times (F-1)} & e^{-j\frac{2\pi \times 0}{F} \times (F-1)} & e^{-j\frac{2\pi \times 1}{F} \times (F-1)} & \cdots & e^{-j\frac{2\pi \times \left(\frac{F}{2}-1\right)}{F} \times (F-1)} \\ e^{-j\frac{2\pi \times \frac{F}{2}}{F} \times 0} & \cdots & e^{-j\frac{2\pi \times (F-1)}{F} \times 0} & e^{-j\frac{2\pi \times 0}{F} \times 0} & e^{-j\frac{2\pi \times 1}{F} \times 0} & \cdots & e^{-j\frac{2\pi \times \left(\frac{F}{2}-1\right)}{F} \times 0} \\ e^{-j\frac{2\pi \times \frac{F}{2}}{F} \times 1} & \cdots & e^{-j\frac{2\pi \times (F-1)}{F} \times 1} & e^{-j\frac{2\pi \times 0}{F} \times 1} & e^{-j\frac{2\pi \times 1}{F} \times 1} & \cdots & e^{-j\frac{2\pi \times \left(\frac{F}{2}-1\right)}{F} \times 1} \\ \vdots & \ddots & \vdots & \vdots & \vdots & \ddots & \vdots \\ e^{-j\frac{2\pi \times \frac{F}{2}}{F} \times \left(\frac{F}{2}-1\right)} & \cdots & e^{-j\frac{2\pi \times (F-1)}{F} \times \left(\frac{F}{2}-1\right)} & e^{-j\frac{2\pi \times 0}{F} \times \left(\frac{F}{2}-1\right)} & e^{-j\frac{2\pi \times 1}{F} \times \left(\frac{F}{2}-1\right)} & \cdots & e^{-j\frac{2\pi \times \left(\frac{R}{2}-1\right)}{F} \times \left(\frac{F}{2}-1\right)} \end{bmatrix} \quad [\text{Eq. 19}]$$

$$S_2\{\gamma, \sigma\} = \begin{cases} 1, \text{ if } \gamma = \text{mod}(\delta(s_m)+k, F) \\ \text{ and } \sigma = (2K_2+1)m + K_2 + k \\ 0, \text{ otherwise} \end{cases} \quad [\text{Eq. 24}]$$

by setting individual elements of the matrix to 1 or 0 for $m=0, \ldots, M-1$ and $k=-K_2, \ldots, K_2$.

With all matrix operations in place, the resulting signal from the R-DBFN can be calculated as follows $$A = (S_2 D)^T \tilde{W}(S_1 B) v \quad [\text{Eq. 25}]$$

Accordingly, the second weight factors $d_m$ (e.g., used at step S830 of method 800) may be determined based on a second window function $\varphi_m^{(pos)}$ spanning the second predetermined number $2K_2+1$ of second intermediate signals. A shape of the second window function $\varphi_m^{(pos)}$ may depend on a location in the second signal domain of a respective output signal port (see, e.g., [Eq. 10]). For example, the shape may depend on a distance, in the second signal domain, from the respective output signal port to a closest one among the output ports of the FFT (see, e.g., [Eq. 12]). Optionally, the second weight factors may further depend on any first window functions applied to identical signals derived from input signals and comprise respective contributions for removing signal distortion resulting from said first window functions being applied. This dependence on the first window function may be expressed via the inverse of the first window function $\hat{\varphi}_m^{(pos)}$.

Further, also the mappings between output ports of the FFT and output signal ports, for example as given by the switch matrix $S_2$ may depend on the locations of the output signal ports in the second signal domain. For example, said mappings may depend on respective distances, in the second signal domain, between the output signal ports and the output ports of the FFT.

3.2. Configuring the Switch Matrices to Support Uniformly Distributed Input or Output Signal Ports If the input signal ports are uniformly distributed (like UB-NE or UE-NB) or the output signal ports are uniformly distributed (like NB-UE or NE-UB), the processor depicted in FIG. 14A may be reconfigured as follows to reduce complexity:

If the output signal ports of the processor are uniformly distributed between $$\left[-\frac{N_x}{2}, \frac{N_x}{2}\right)$$

and $M=N$, but the input signal ports are non-uniform (such as NB-UE and NE-UB), the following settings may be implemented:

- $K_2=0$, as there is no need for a second window function at the postprocessor. Therefore, $\varphi_m^{(pos)}=[1]$, for $m=0, \ldots, M-1$.
- $c_2=1$ because oversizing at the output is no longer needed and the size of the FFT is $c_1 N_x$ keeping $a=1$. The inverse of the first window function at the postprocessor is still required (which means only a single multiplier per output signal port is sufficient) i.e., $\hat{\varphi}_m^{(pos)} = \hat{\varphi}_{c_1 N_x}(s_m)$, where $$s_m = -\frac{M}{2}, \ldots, \frac{M}{2}-1,$$

due to the uniformity at the output ports.

This simplifies the D matrix as follows $$D = \begin{bmatrix} \hat{\varphi}_0^{(pos)} & & 0 \\ & \ddots & \\ 0 & & \hat{\varphi}_{M-1}^{(pos)} \end{bmatrix} \quad [\text{Eq. 26}]$$

It should be noted that these settings form an M×M identity matrix within the Switching matrix $S_2$ according to [Eq. 24].

in the preprocessor, the values corresponding the inverse of the second window function should be set to unity, i.e., $\hat{\varphi}_n^{(pre)}=[1]$.

Figure 18A:
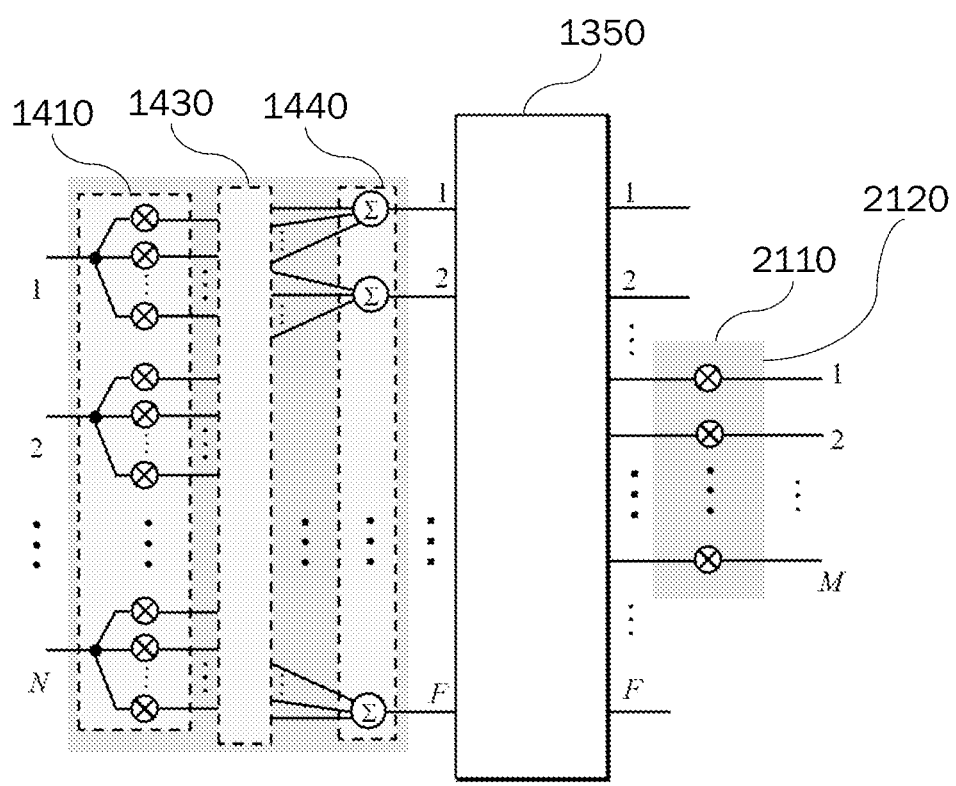
FIG. 18A, FIG. 18B, and FIG. 18C schematically illustrate examples of possible realizations of the digital beamforming processor according to embodiments of the disclosure.

The structure of the corresponding realization of the R-DBFN can be seen in FIG. 18A.

If the input signal ports of the preprocessor are uniformly distributed between $$\left[-\frac{N_x}{2}, \frac{N_x}{2}\right)$$

and $N=N_x$, but the output signal ports are non-uniform (such as UB-NE and UE-NB), the following settings may be implemented:

- $K_1=0$ as there will be no need for a first window function at the preprocessor. Therefore, $\varphi_n^{(pre)}=[1]$ for $n=0, \ldots, N-1$.
- $c_1=1$ because oversizing at the input is no longer needed and the size of the FFT is $c_2 N_x$ keeping $a=1$. The inverse of the second window function at the preprocessor is still needed, (which means only a single multiplier per input signal port is sufficient), i.e., $\hat{\varphi}_n^{(pre)} = [\hat{\varphi}_{c_2 N_x}(x_n)]$, where $$x_n = -\frac{N}{2}, \ldots, \frac{N}{2}-1,$$

due to the uniformity at the input ports.

This simplifies the B matrix as follows.

$$B = \begin{bmatrix} b_0(0) & & 0 \\ & \ddots & \\ 0 & & b_{N-1}(0) \end{bmatrix} = \begin{bmatrix} \hat{\varphi}_{c_2 N_x}(x_0) & & 0 \\ & \ddots & \\ 0 & & \hat{\varphi}_{c_2 N_x}(x_{N-1}) \end{bmatrix}. \quad [\text{Eq. 27}]$$

It should be noted that these settings form an N×N identity matrix within the Switching matrix $S_1$ according to [Eq. 18].

in the postprocessor, the values associated with the inverse of the first window function should be set to 'unity,' i.e., $\hat{\varphi}_m^{(pos)}=1$.

Figure 18B:
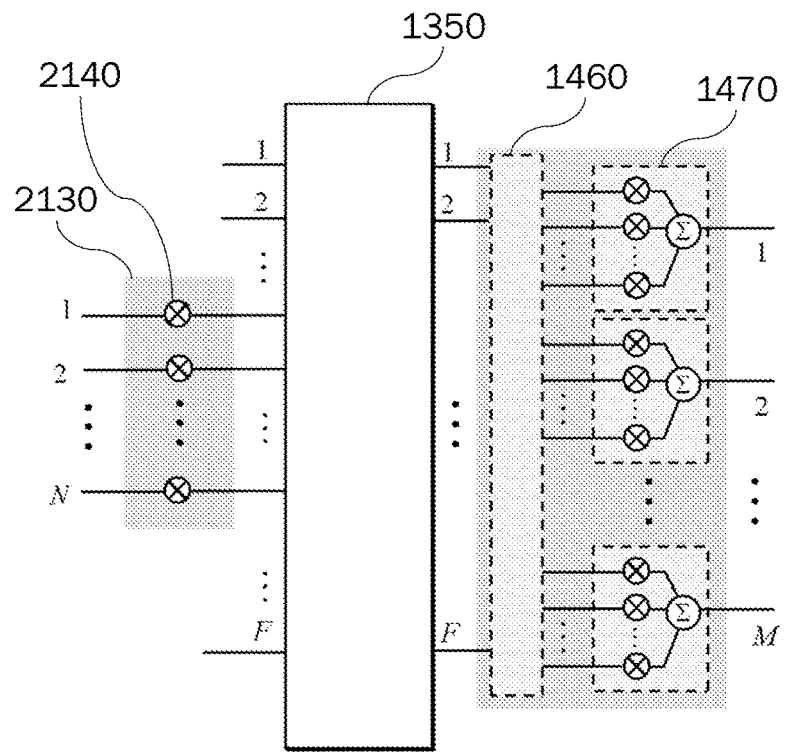

The structure of the corresponding realization of the R-DBFN can be seen in FIG. 18B.

3.3. Implementation of a Wideband Multibeam Antenna Array Device

The BFN described in the present disclosure may be put to use for implementing a wideband multibeam antenna array device (wideband multibeam antenna array circuitry). Such wideband multibeam antenna array device may comprise the BFN and an array of signal conditioning chains. Each signal conditioning chain may comprise an RF port (or antenna element) and one or more analogue and/or digital signal processing units. As such, the signal conditioning chains may comprise or relate to, for example, the receive signal processing chains 1220 or the transmit signal processing chains 1225 illustrated in the example of FIG. 12. In this configuration, for use in the receive mode, the input signal ports of the BFN may be connected to the signal conditioning chains to retrieve M beams at the output signal ports of the BFN. Alternatively, for use in the transmit mode, the output signal ports of the BFN may be connected to the signal conditioning chains to transmit N beams applied at the input signal ports of the beamforming network.

3.4. Implementation of a Narrowband Multibeam Antenna Array Device

The BFN described in the present disclosure may be also put to use for implementing a narrowband multibeam antenna array device (narrowband multibeam antenna array circuitry). Such narrowband multibeam antenna array device may comprise two or more BFNs and an array of signal conditioning chains. Each signal conditioning chain may comprise an RF port (or antenna element) and one or more analogue and/or digital signal processing units. As such, the signal conditioning chains may comprise or relate to, for example, the receive signal processing chains 1220 or the transmit signal processing chains 1225 illustrated in the example of FIG. 12. In this configuration, for use in the receive mode, the input signal ports of the BFNs may be connected to the signal conditioning chains followed by frequency demultiplexers to retrieve narrowband channels associated with multiple beams at the output signal ports of individual ones of the BFNs. Alternatively, for use in the transmit mode, the output signal ports of the BFNs may be connected to the signal conditioning chains through frequency multiplexers to transmit the narrowband channels associated with the multiple beams applied at the input signal ports of the BFNs.

Figure 14B:
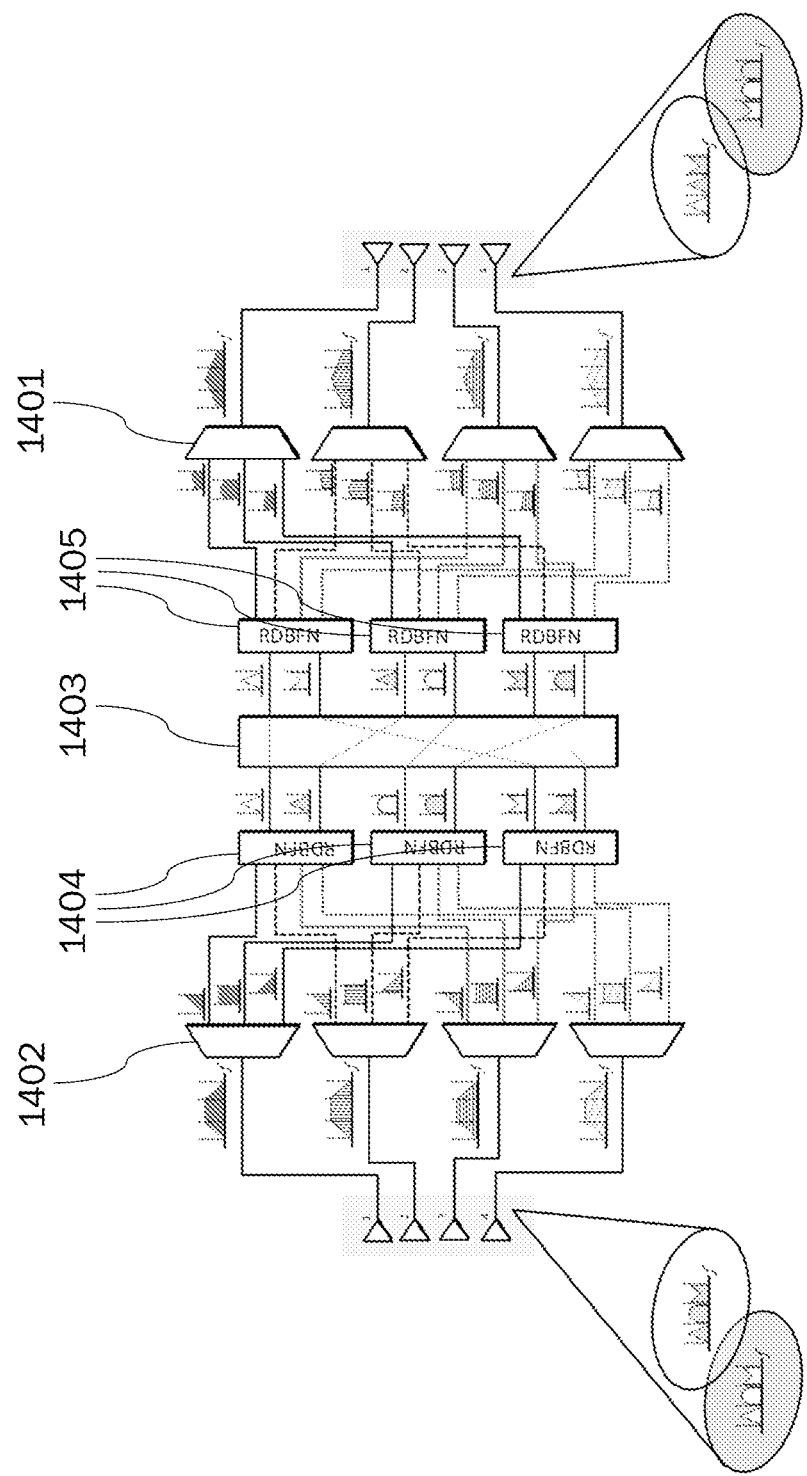
FIG. 14B schematically illustrates an example of a narrowband multibeam architecture according to embodiments of the disclosure.

An example is shown in FIG. 14B. In FIG. 14B the communication scenario is simplified (without intended limitation) for representation purposes. A fully beamformed implementation is presented with only two transmit and two receive beams. Both transmit and receive antennas are composed of only four antenna elements each in this example, and there are three narrowband channels per beam. This configuration can easily be extended to depending on the communication scenario. In FIG. 14B, the frequency multiplexers 1401 and demultiplexers 1402 can be implemented using digital filter banks. Some of the R-DBFNs can be configured in the receive mode 1404 while some others can work on the transmit mode 1405 depending on whether they are processing the demultiplexed signals or they are processing the narrowband signals prior to the multiplexers 1401. The switch 1403 in the middle of the architecture is necessary for full beam-to-beam routing of communication signals. Note that switching, frequency multiplexing, and demultiplexing can be implemented by the digital OBP.

3.5. Computational Complexity of the R-DBFN

The computational complexity of the R-DBFN can be measured in terms of the total number of real multiplications and real additions needed.

Figure 15A:
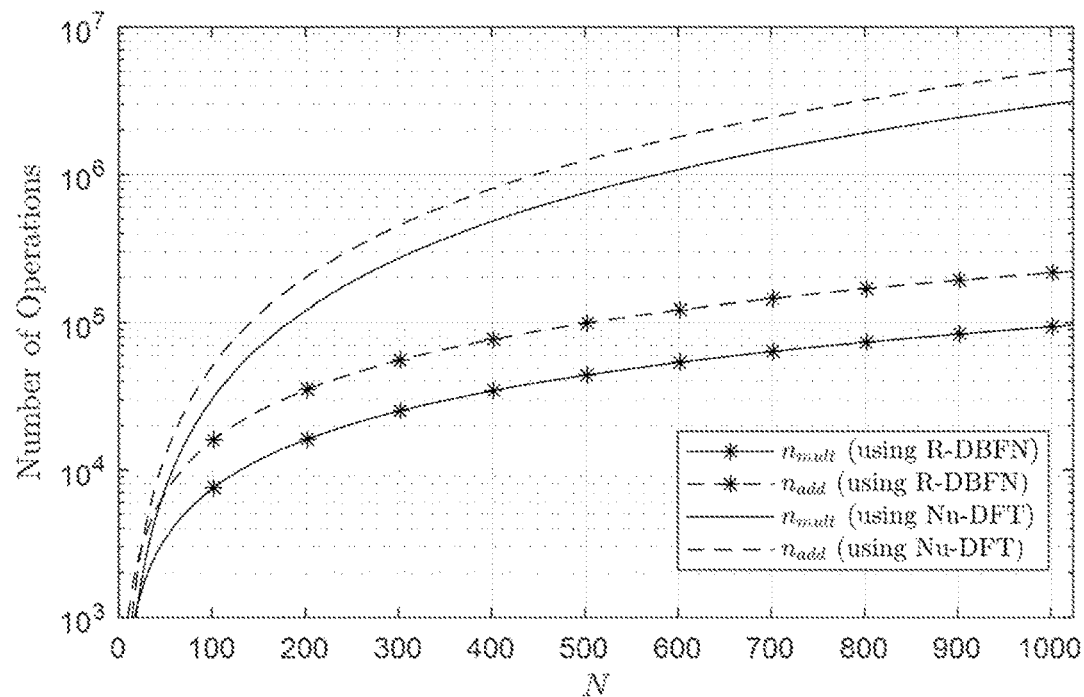
FIG. 15A and FIG. 15B show examples of the number of arithmetic operations needed to implement a digital BFN associated with the proposed digital beamforming processor and non-uniform DFT considering different oversizing ratios.
Figure 15B:
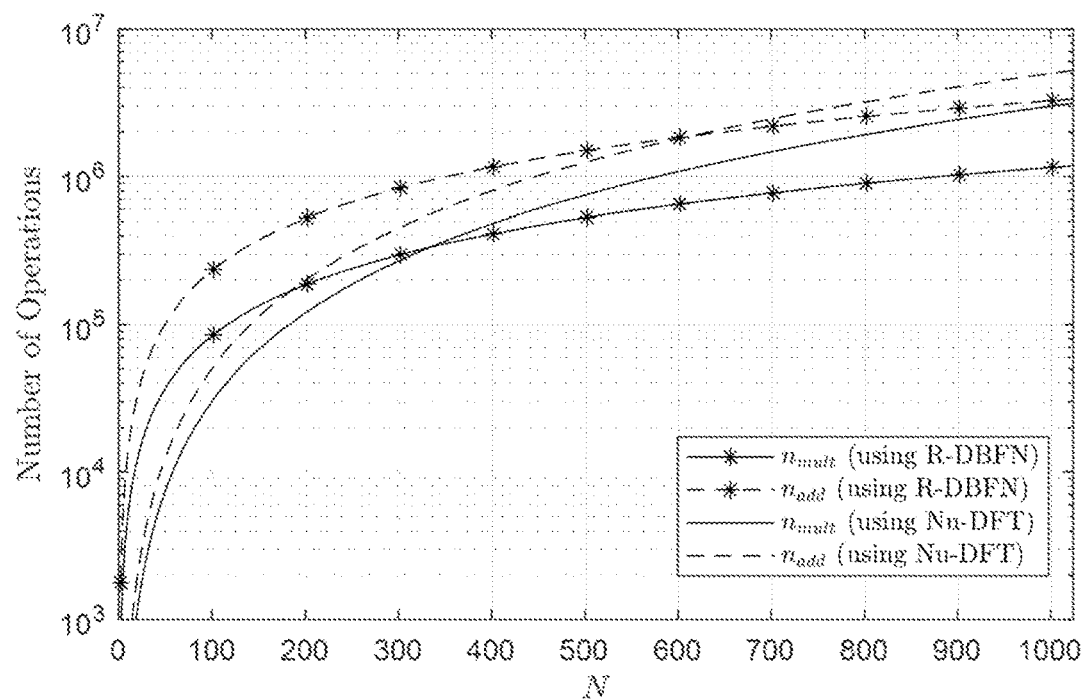

A number of observations on the computational complexity of the R-DBFN may be summarized as follows:

The use of the R-DBFN can significantly reduce the number of operations in comparison to a beamforming scheme based on the Nu-DFT, as illustrated in FIG. 15A and FIG. 15B, which show examples of the number of operations needed to implement the R-DBFN versus Nu-DFT considering different oversizing ratios ($n_{mult}$ is the number of multiplications and $n_{add}$ is the number of additions). In FIG. 15A, the upper two curves (i.e., the un-starred curves) relate to the Nu-DFT. In FIG. 15B, the two curves that are lower for lower values of N (i.e., the un-starred curves) relate to the Nu-DFT. Simulation parameters are $K_1=K_2=6$, $N=M=N_x$, and further, $ac_2=c_1=2$ for FIG. 15A and $ac_2=c_1=8$ for FIG. 15B. As can be seen from FIG. 15A, the number of operations can be reduced by over 95% when the R-DBFN is used instead of an alternative based on the Nu-DFT. However, increasing the oversizing ratio reduces the savings associated with the proposed BFN. This can be seen from FIG. 15B, which was simulated for a higher oversizing ratio, where the computational complexity of the R-DBFN is comparable to the Nu-DFT. Therefore, it may be preferably to choose the oversizing ratio values as low as possible, for example as values of about two.

Regardless of the value chosen for the oversizing ratio, there is always a point where the Nu-DFT achieves lower complexity than the R-DBFN (this can be observed both in FIG. 15A and FIG. 15B, where the respective curves have a crossover). Especially when a lower number of radiating elements are to be used or fewer beams are to be generated, the Nu-DFT may be a better choice to achieve lower complexity. It may be advisable to check this issue before deciding on a choice between these two implementations.

Figure 16A:
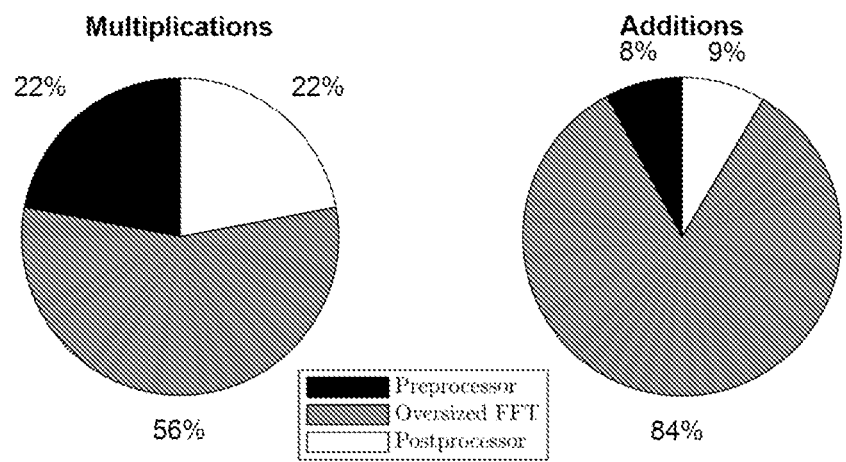
FIG. 16A and FIG. 16B show an example of the distribution of the number of addition and multiplication operations among the sub-modules of the digital beamforming processor.
Figure 16B:
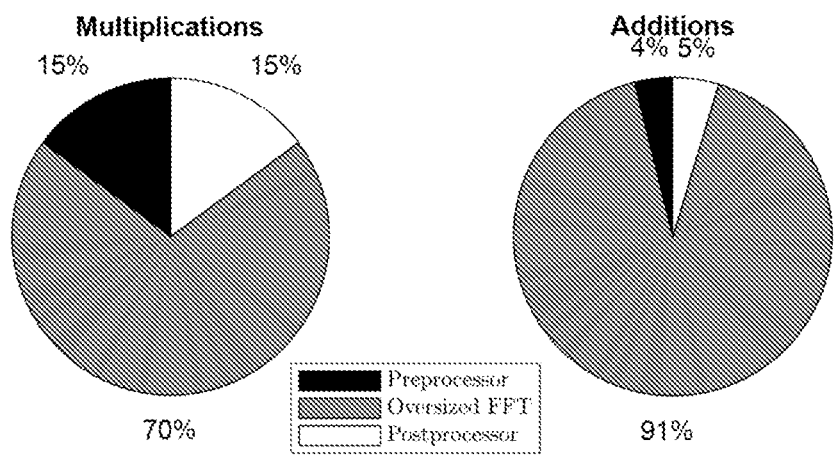

The sizing of the vectors of the first and the second weight factors plays another important role in the preprocessor and postprocessor complexity. This is illustrated in FIG. 16A and FIG. 16B, which show distribution of the number of real additions and real multiplications for the R-DBFN, for simulation parameters ($N=M=N_x=1024$, $ac_2=c_1=2$, $K_1=K_2=6$) and ($N=M=N_x=1024$, $ac_2=c_1=2$, $K_1=K_2=3$), respectively. Reducing the size of the vectors of weight factors by half (i.e., changing the values of $K_1$ and $K_2$ from 6 to 3) reduces the preprocessor and postprocessor complexity so that the FFT unit itself becomes the major source of computational complexity. Notably, the case where $K_1=K_2=3$ may be very likely in the fixed-point implementation, and further reduction may even possible, as described in the next section when shorter wordlengths are selected to represent each weight factor.

Figure 17A:
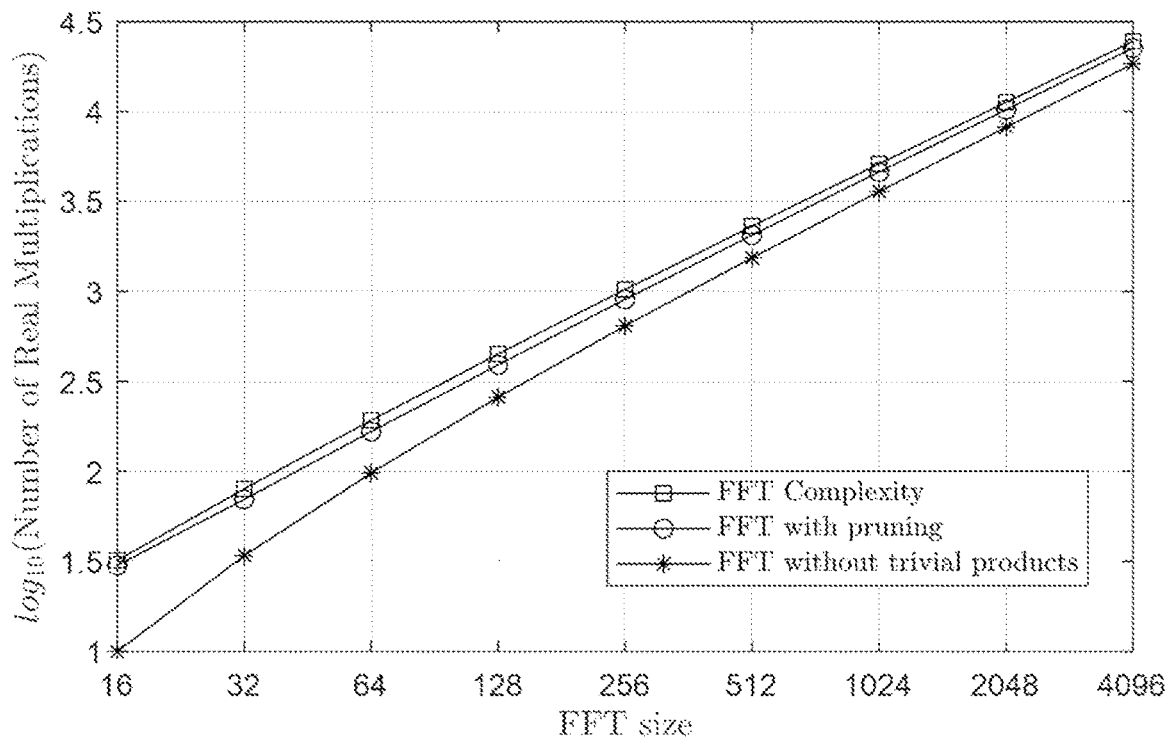
FIG. 17A and FIG. 17B show a comparison of the number of arithmetic operations for different implementation options for the FFT.
Figure 17B:
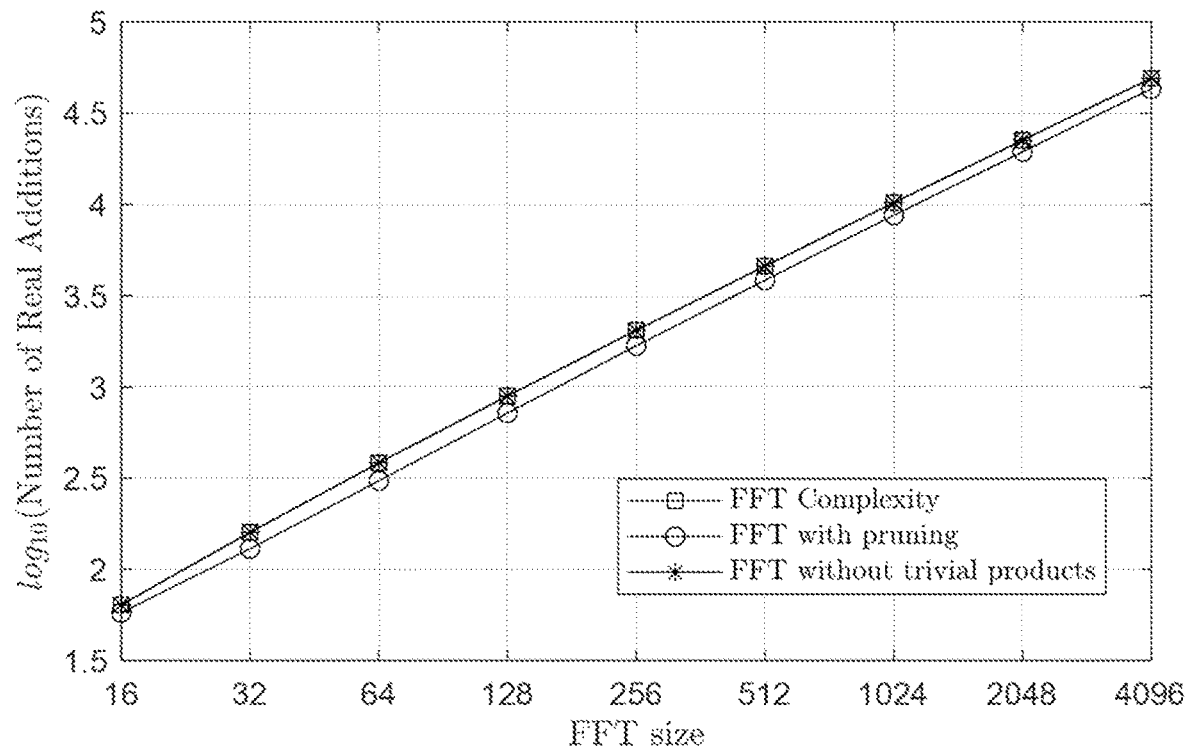

It is possible to perform fewer complex multiplications within the FFT unit by ignoring trivial multiplications or by considering zero padding at the input and output of the FFT unit. As an example, FIG. 17A and FIG. 17B compare the number of arithmetic operations for different FFT options. Therein, the "FFT Complexity" is the original FFT complexity free from any constraints, while "FFT with pruning" is when zero padding is considered, and "FFT without trivial products" ignores multiplications by 1 and j (where j is the imaginary unit defined by $j^2=-1$) without pruning.

3.6. Fixed-Point Realization of the R-DBFN

Figure 18C:
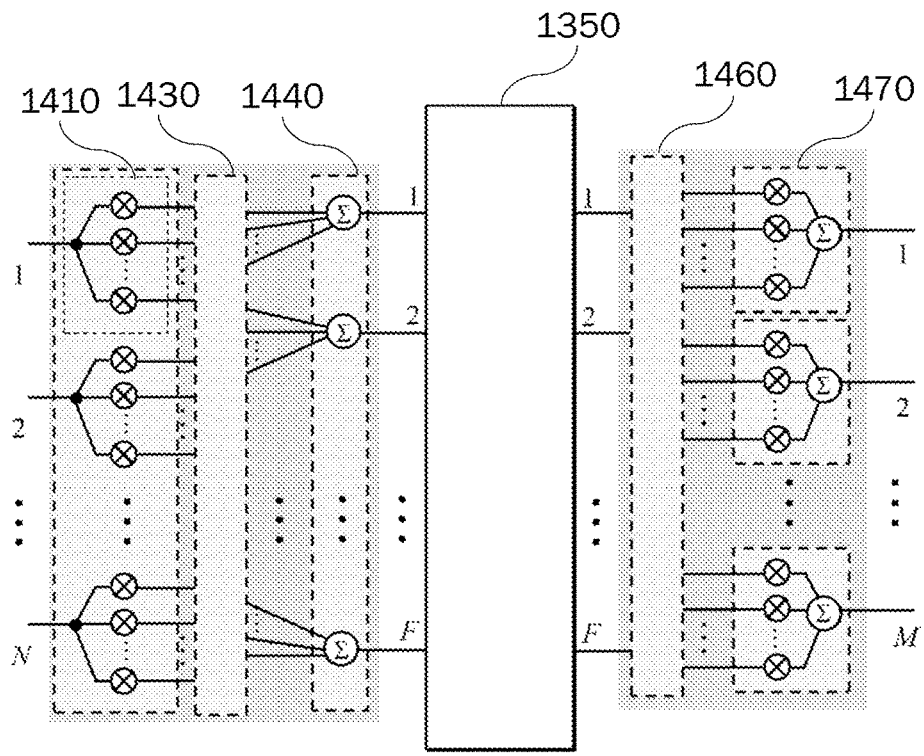

Next, the fixed-point implementation of the R-DBFN processor is discussed. The discussion is divided into three parts, considering the three possible realizations of the R-DBFN, in either receive or transmit beamforming (see Table 1). Examples of respective processors are shown in FIG. 18A, FIG. 18B, and FIG. 18C. For presentation purposes, without intended limitation, only the receive beamforming is shown, but the discussions can be easily extended to transmit beamforming.

3.6.1. Non-Uniform Elements and Uniform Beams (NE-UB)

FIG. 18A shows an example of an R-DBFN processor with non-uniform inputs and uniform outputs. The beams (e.g., the output of the processor in receive mode) are assumed to be uniformly distributed, while the input antenna element locations are non-equispaced in the form of a "sparse array." In this realization, the R-DBFN processor comprises a plurality of weighting units 1410, a switch matrix 1430, a plurality of adders 1440, an FFT 1350, as well as a plurality of weighting units (or multipliers) 2120 in a simplified version 2110 of the postprocessor. The window function may be assumed to be quantized using three bits, for example. The following observations can be made:

To avoid the problem with the representation of +1, the range of the input samples may be set between {0.5+0.5j, −0.5−0.5j}.

The first weight factors can be unsigned. No sign bits or integer bits are required. To avoid the problem with the representation of +1, the range of first weight factors may be set below 1. This also benefits the system by slowing the growth of the integer part in the accumulation process. For example, only three fractional bits may be chosen to represent the first weight factors. An important benefit of using a short word length is that there will be no need to use general purpose multipliers, and the multiplications with these weight factors can easily be implemented using hard-wired shift and add operations or multiplication by zero, which can be selected from the following set of weight factors $$\{0, 0.125, 0.25, 0.375, 0.5, 0.625, 0.75, 0.875\} \quad [\text{Eq. 28}]$$

Not knowing exactly how many two input adders are needed per FFT input might lead to a design problem in the digital implementation when there is need for reconfigurability. Therefore, the adders following the configurable switch matrix (as shown in FIG. 18A) could be scaled considering the worst case number of two input adders needed. On the other hand, this is not a problem for UE-NB because the configuration is needed not in between the adders and the multipliers but between the FFT and the processing element.

The FFT is implemented in a way that the growth of word length is circumvented at each butterfly stage by dividing the result of the twiddle multiplication by two. However, this may introduce an amount of noise in the form of quantization noise. Nevertheless, it has been found that the quantization noise is not significant in the implementations at hand.

The fixed-point implementation of the second weight factors associated with the inverse of the first window function does not affect the shape of the beam, but only scales individual beams. The second weight factors can be implemented in combination with the scaling required for the rest of the fixed-point implementation. Therefore, the second weight factors may be excluded in the implementation of NE-UB.

Figure 19A:
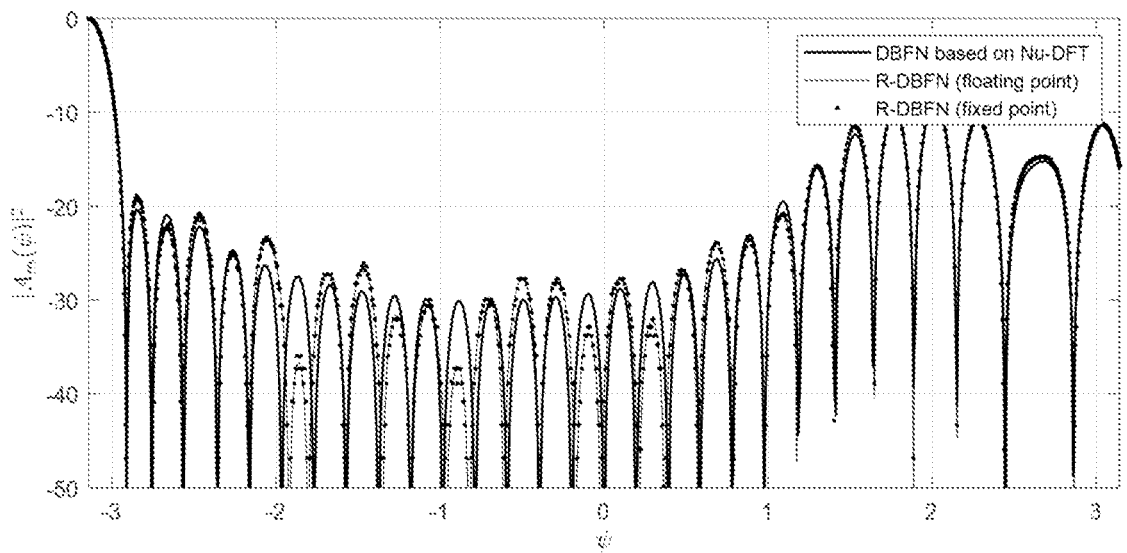
FIG. 19A and FIG. 19B illustrate examples of an array factor for different numbers of bits used for quantizing weight factors in the digital beamforming processor.
Figure 19B:
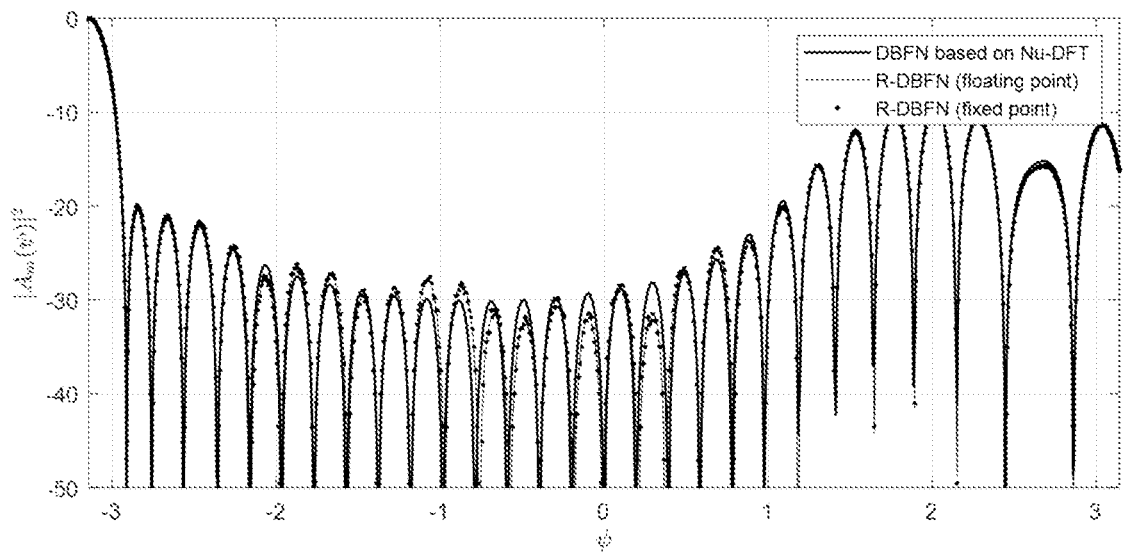

A fixed point model of the R-DBFN processor to support NE-UB, shown in FIG. 18A, was developed in MATLAB© for performance evaluation. For this, a sparse array of 32 feeds has been assumed, which is used to generate 16 random beams. For an example of the non-equispaced locations of the sparse antenna elements for N=32 reference is made to FIG. 7A. For an example of M=16 individual beams that are to be generated using this sparse array reference is made to FIG. 7B. As can be seen, the multiple beams generated by the NE-UB are equispaced. For the present choice of the word length size for the first weight factors, sidelobe levels are produced that are between 1-2 dB different from the originals produced using the Nu-DFT. This is illustrated in FIG. 19A, assuming that three bits are used to quantize the first weight factor. If a near perfect result with less noise is preferable, the number of bits per weight factor can be increased, leading to the results shown in FIG. 19B, where four bits are used to quantize the first weight factor. In both of these figures, "R-DBFN (floating point)" indicates the simulation result where the weight factors are quantized, but for the rest of the processor a floating-point implementation is assumed. On the other hand, "R-DBFN (fixed-point)" assumes a complete end-to-end fixed-point implementation of the structure shown in FIG. 18A.

3.6.2. Uniform Elements and Non-Uniform Beams (UE-NB)

FIG. 18B shows an example of the R-DBFN processor based on uniform inputs and non-uniform outputs. The beams (i.e., the output of the processor) are assumed to be non-uniformly distributed, while the input antenna element locations are assumed to be uniform. In this realization, the R-DBFN processor comprises a simplified version 2130 of the preprocessor, with a plurality of weighting units (or multipliers) 2140. The R-DBFN processor further comprises an FFT 1350, a switch matrix 1460, and a plurality of weighting units 1470 with multipliers and adders.

Figure 20:
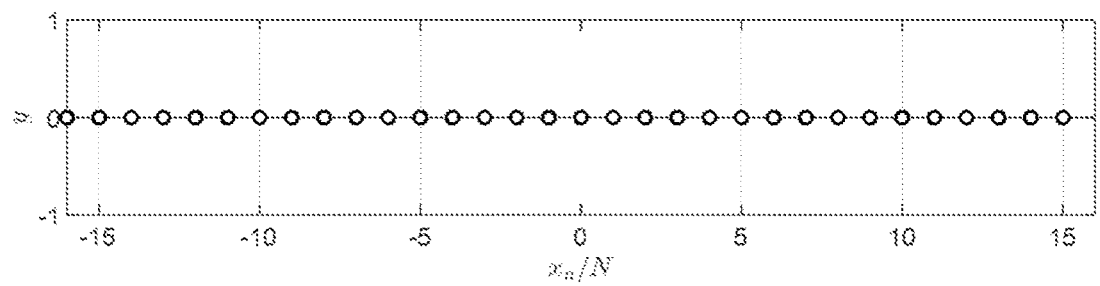
FIG. 20 illustrates an example of uniformly spaced antenna elements locations of a linear array.
Figure 21:
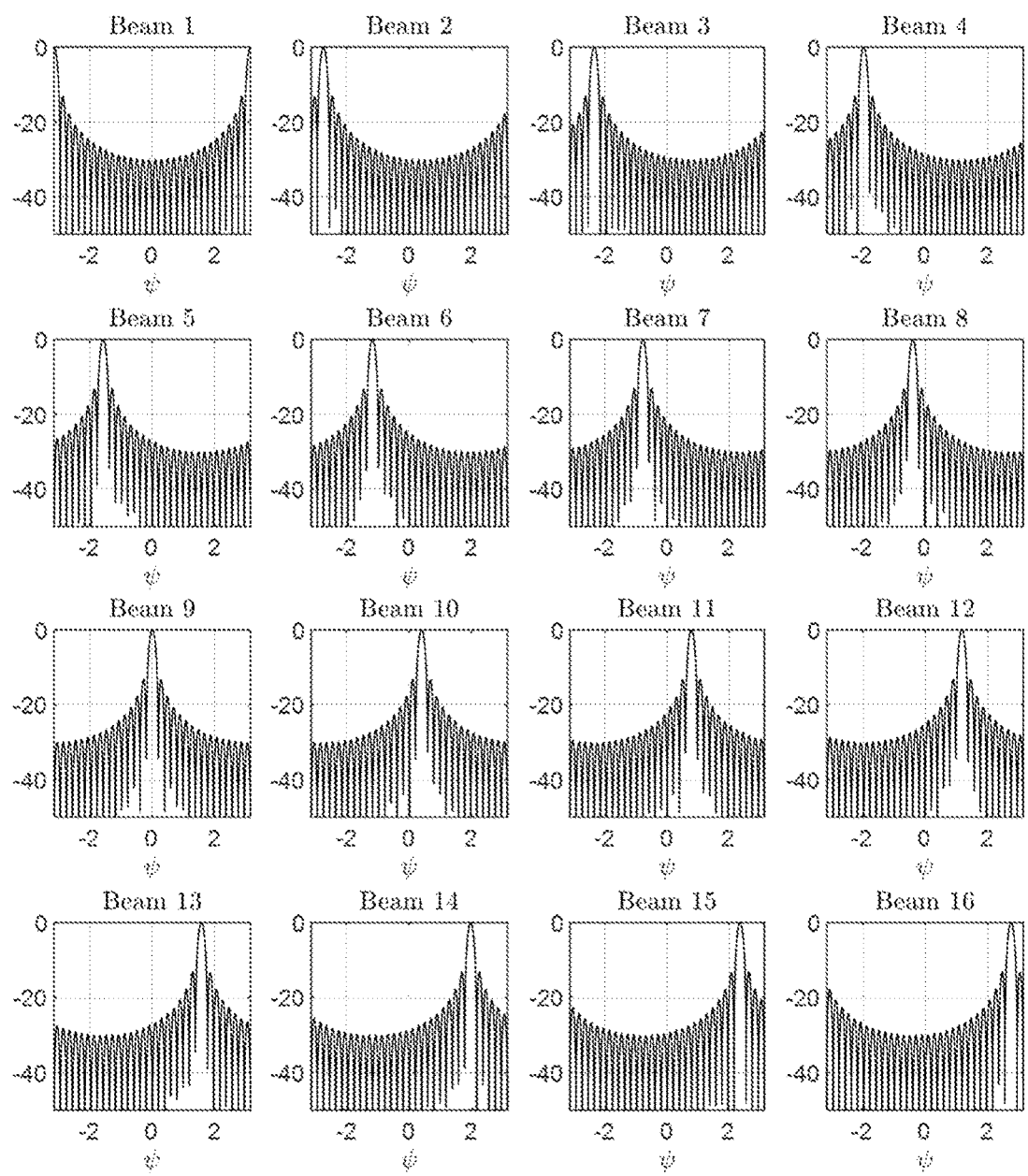
FIG. 21 illustrates an example of a plurality of non-equispaced beam pointing directions generated using the linear array of FIG. 20.
Figure 22A:
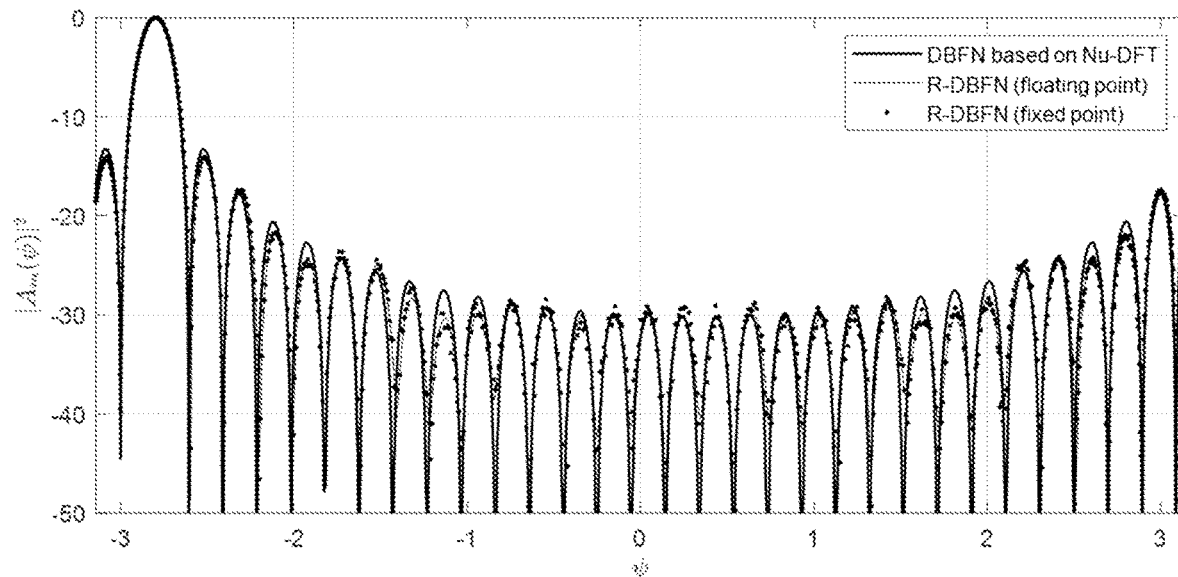
FIG. 22A and FIG. 22B illustrate examples of an array factor of two particular beams for different realizations of the digital beamforming processor and different numbers of bits used for quantizing the weight factors.

For this realization, for example a uniform linear array of 32 feeds may be assumed for generating 16 non-uniformly distributed beam locations. An example of the locations of the uniform linear array is given in FIG. 20 and an example of the individual beams is shown in FIG. 21. An almost identical beam shape can be observed when quantizing both the first and second weight factors using only three bits. This can be seen from FIG. 22A, which shows an example of one of the 16 beams generated using the UE-NB realization of the R-DBFN when both first and the second weight factors are quantized using 3 bits.

3.6.3. Non-Uniform Elements and Non-Uniform Beams (NE-NB)

Figure 22B:
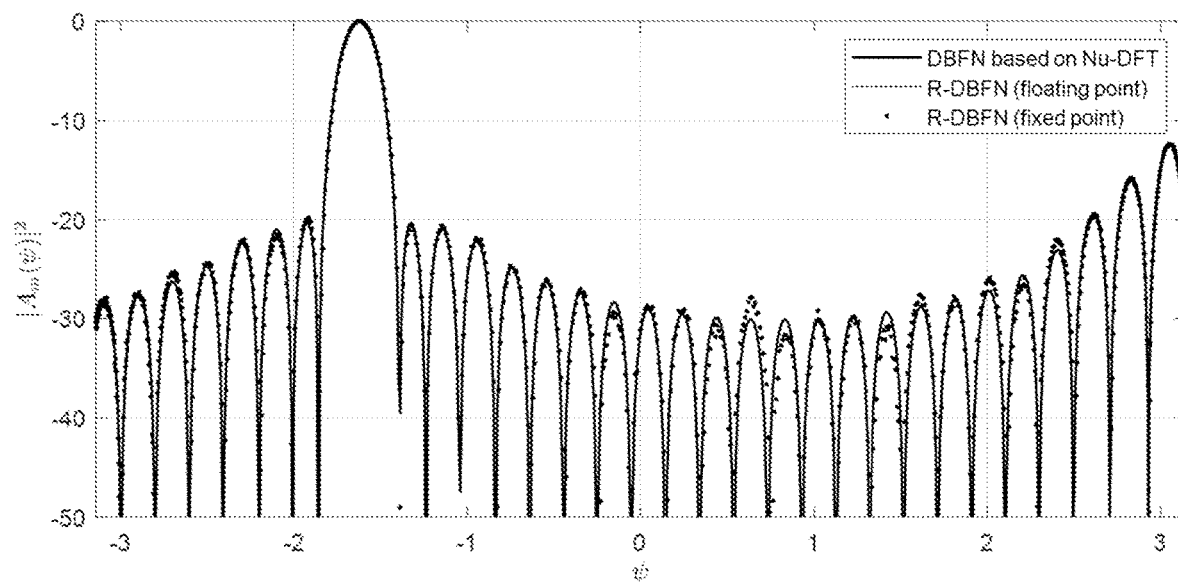

A more general realization of the R-DBFN is shown in FIG. 18C, where both input and output signal ports of the processor are non-uniform. As such, elements of the R-DBFN in FIG. 18C may correspond to those shown in FIG. 14A. Because the preprocessor and the postprocessors are designed to reflect the contributions from both the window functions and their inverse functions, the resolution of the weight factors should be higher than those of NE-UB and UE-NB. For instance, a longer word length of five bits may be chosen to represent these multiplicative coefficients for the fixed point realization of the NE-NB. An example of one of the 16 beams, produced by the beamformer, is shown in FIG. 22B for the case of all multiplicative coefficients (i.e., weight factors) being quantized using five bits.

Further simulation results have shown that the proposed R-DBFN processor yields similar performance results for linear antenna arrays of size larger than N=32 too.

4. Interpretation

The present disclosure relates to both apparatus/devices and methods for implementing techniques described throughout the disclosure. The apparatus may comprise one or more processors and a memory coupled to the processor(s). The processor may be adapted to carry out all steps of the methods described throughout the disclosure. This apparatus may relate to a BFN, antenna device, or FFT processor, for example. Further, the present disclosure likewise relates to a computer program comprising instructions that, when executed by a processor (e.g., computer processor, server processor), cause the processor to carry out all steps of the methods described throughout the disclosure. Yet further, the present disclosure likewise relates to a computer-readable storage medium storing the aforementioned computer program.

It is further understood that any circuitry, units, blocks, or modules described above may be implemented by a computer processor or respective computer processors, or the like.

It should further be noted that the description and drawings merely illustrate the principles of the proposed methods and devices. Those skilled in the art will be able to implement various arrangements that, although not explicitly described or shown herein, embody the principles of the disclosure and are included within its spirit and scope. Furthermore, all examples and embodiments outlined in the present document are principally intended expressly to be only for explanatory purposes to help the reader in understanding the principles of the proposed method and system. Furthermore, all statements herein providing principles, aspects, and embodiments of the disclosure, as well as specific examples thereof, are intended to encompass equivalents thereof.

REFERENCES

[Kale] "Session 2: The Fourier Summation Transform" in Notes for the Short Course on DSP Communication Processor Design delivered by I. Kale, A. Coskun, S. Cetinsel, 2018.
[Aulock] W. H. Von Aulock, "Properties of Phased Arrays," in Proceedings of the IRE, Vol. 48, No. 10, pp. 1715-1727, October 1960.
[Schelkunoff] S. A. Schelkunoff, "A Mathematical Theory of Linear Arrays," Bell System Technical Journal, Vol. 22, No. 1, pp. 80-107, January 1943.
[Orfanidis] S. J. Orfanidis, "Chapter 22: Antenna Arrays," in Electromagnetic Waves and Antennas, Available at: https://www.ece.rutgers.edu/~orfanidi/ewa/, Latest revision date—Aug. 1, 2016.
[Dutt] A. Dutt and V. Rokhlin, "Fast fourier transforms for nonequispaced data," SIAM Journal on Scientific computing, vol. 14, no. 6, pp. 1368-1393, 1993.
[Capozzoli] A. Capozzoli, C. Curcio, and A. Liseno, "Optimized nonuniform FFTs and their application to array factor computation," IEEE Trans. Antennas Propag., vol. 67, no. 6, pp. 3924-3938, June 2019.
[Potts] D. Potts, G. Steidl, and M. Tasche, "Fast Fourier transforms for nonequispaced data: A tutorial," in Modern Sampling Theory: Mathematics and Application, J. J. B. P. Ferreira, Ed. Boston, MA: Birkhauser, 2000, pp. 253-274.
[Fourmont] K. Fourmont, "Non-equispaced fast Fourier transforms with applications to tomography," J. Fourier Anal. Appl., vol. 9, n. 5, pp. 431-450, September 2003.
[Qu et al.] L. Qu, S. An, T. Yang, and Y. Sun, "Group Sparse Basis Pursuit Denoising Reconstruction Algorithm for Polarimetric Through-the-Wall Radar Imaging," International Journal of Antennas and Propagation, vol. 2018, August 2018.

The various embodiments described above can be combined to provide further embodiments. All of the patents, patent application publications, and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of transforming a plurality of input signals received at N input signal ports to a plurality of output signals for output at M output signal ports, the method comprising:
   generating, from the plurality of input signals, a plurality of first intermediate signals for processing by a fast Fourier transform, FFT, wherein the FFT has a predefined number of input ports and output ports corresponding to a size of the FFT;
   applying the FFT to the plurality of first intermediate signals to obtain a plurality of second intermediate signals; and
   generating, from the plurality of second intermediate signals, the plurality of output signals,
   wherein the N input signal ports are non-uniformly distributed with respect to the input ports of the FFT in a first signal domain, which is a signal domain of the input ports of the FFT; and/or
   wherein the M output signal ports are non-uniformly distributed with respect to the output ports of the FFT in a second signal domain, which is a signal domain of the output ports of the FFT.

2. The method according to claim 1,
   wherein generating the first intermediate signals involves routing, between input signal ports and input ports of the FFT, and scaling of input signals in accordance with their positions in the first signal domain and/or a distance relationship between respective input signal ports and input ports of the FFT in the first signal domain, and summing scaled signals from different input signal ports routed to the same input ports of the FFT; and/or
   wherein generating the output signals involves routing, between output ports of the FFT and output signal ports, and scaling of second intermediate signals in accordance with their positions in the second signal domain and/or a distance relationship between respective output ports of the FFT and signal output ports in the second signal domain, and summing scaled signals from different output ports of the FFT routed to the same output signal port.

3. The method according to claim 1,
   wherein the FFT is oversized with respect to the N input signal ports and wherein generating the plurality of first intermediate signals from the plurality of input signals involves, for each input signal, applying respective first weight factors to each of a first predetermined number of identical signals derived from the input signal and mapping the weighted signals to respective input ports of the FFT, or, for each input signal, mapping each of the first predetermined number of the identical signals derived from the input signal to respective input ports of the FFT and applying respective first weight factors to the mapped signals, and for each input port of the FFT, summing the respective weighted signals for this input port to generate a respective first intermediate signal for input to the FFT; and/or
   wherein the FFT is oversized with respect to the M output signal ports and wherein generating the plurality of output signals from the plurality of second intermediate signals involves, for each output signal port, applying respective second weight factors to each of a second predetermined number of identical signals derived from the second intermediate signals, and mapping the weighted signals to the output signal port, or, for each output signal port, mapping the second predetermined number of second intermediate signals to the output signal port, applying respective second weight factors to the mapped signals, and for each output signal port summing the respective weighted signals to generate a respective output signal.

4. The method according to claim 3,
wherein the first weight factors are determined based on a first window function spanning the first predetermined number of identical signals derived from the input signal, where a shape of the first window function depends on a distance, in the first signal domain, from the respective input signal port to a closest one among the input ports of the FFT; and/or
wherein the second weight factors are determined based on a second window function spanning the second predetermined number of second intermediate signals, where a shape of the second window function depends on a distance, in the second signal domain, from the respective output signal port to a closest one among the output ports of the FFT.

5. The method according to claim 4,
wherein the first weight factors further depend on any second window functions applied to second intermediate signals and comprise respective contributions for removing signal distortion resulting from said second window functions being applied; and/or
wherein the second weight factors further depend on any first window functions applied to identical signals derived from input signals and comprise respective contributions for removing signal distortion resulting from said first window functions being applied.

6. The method according to claim 1,
wherein, in a receive mode, the plurality of input signals relate to N antenna signals received at respective antenna elements of an array antenna, and the plurality of output signals relate to M beam signals corresponding to respective antenna beams of the array antenna.

7. The method according to claim 6, further comprising:
receiving the plurality of N input signals from respective antenna elements of the array antenna and outputting the plurality of output signals as the beam signals in the receive mode.

8. The method according to claim 1,
wherein, in a transmit mode, the plurality of input signals relate to N beam signals corresponding to respective antenna beams to be transmitted by the array antenna, and the plurality of output signals relate to M antenna signals for exciting respective antenna elements of the array antenna.

9. The method according to claim 8, further comprising:
outputting the plurality of output signals for transmission by the antenna elements of the array antenna in the transmit mode.

10. A non-transitory computer-readable storage medium storing a computer program including instructions that cause a processor, when executing the program, to perform the method according to claim 1.

11. A beamforming network for transforming a plurality of input signals to a plurality of output signals, the beamforming network comprising:
a plurality of N input signal ports for receiving the input signals;
a plurality of M output signal ports for outputting the output signals;
a preprocessor module for generating, from the plurality of input signals, a plurality of first intermediate signals for processing by a fast Fourier transform (FFT);
an FFT module for applying the FFT to the plurality of first intermediate signals to obtain a plurality of second intermediate signals, wherein the FFT has a predefined number of input ports and output ports corresponding to a size of the FFT; and
a postprocessor module for generating, from the plurality of second intermediate signals, the plurality of output signals,
wherein the N input signal ports are non-uniformly distributed with respect to the input ports of the FFT in a first signal domain, which is a signal domain of the input ports of the FFT; and/or
wherein the M output signal ports are non-uniformly distributed with respect to the output ports of the FFT in a second signal domain, which is a signal domain of the output ports of the FFT.

12. The beamforming network according to claim 11,
wherein the preprocessor module is configured for routing, between input signal ports and input ports of the FFT, and scaling of input signals in accordance with their positions in the first signal domain and/or a distance relationship between respective input signal ports and input ports of the FFT in the first signal domain, and summing scaled signals from different input signal ports routed to the same input ports of the FFT; and/or
wherein the postprocessor module is configured for routing, between output ports of the FFT and output signal ports, and scaling of second intermediate signals in accordance with their positions in the second signal domain and/or a distance relationship between respective output ports of the FFT and signal output ports in the second signal domain, and summing scaled signals from different output ports of the FFT routed to the same output signal port.

13. The beamforming network according to claim 11,
wherein the preprocessor module is configured to, for each input signal, apply respective first weight factors to each of a first predetermined number of identical signals derived from the input signal and map the weighted signals to respective input ports of the FFT, or, for each input signal, map each of the first predetermined number of the identical signals derived from the input signal to respective input ports of the FFT and apply respective first weight factors to the mapped signals before input to the FFT, and for each input port of the FFT, sum the respective weighted signals for this input port to generate a respective first intermediate signal for input to the FFT; and/or
wherein the postprocessor module is configured to, for each output signal port, apply respective second weight factors to each of a second predetermined number of identical signals derived from the second intermediate signals, and map the weighted signals to the output signal port, or, for each output signal port, map the second predetermined number of second intermediate signals to the output signal port, apply respective second weight factors to the mapped signals, and for each output signal port sum the respective weighted signals to generate a respective output signal.

14. The beamforming network according to claim 13,
wherein the preprocessor module is configured to determine the first weight factors based on a first window function spanning the first predetermined number of identical signals derived from the input signal, where a shape of the first window function depends on a distance, in the first signal domain, from the respective input signal port to a closest one among the input ports of the FFT; and/or wherein the postprocessor module is configured to determine the second weight factors based on a second window function spanning the second predetermined number of second intermediate signals, where a shape of the second window function depends on a distance, in the second signal domain, from the respective output signal port to a closest one among the output ports of the FFT.

15. The beamforming network according to claim 14, wherein the first weight factors further depend on any second window functions applied to second intermediate signals and comprise respective contributions for removing signal distortion resulting from said second window functions being applied; and/or wherein the second weight factors further depend on any first window functions applied to identical signals derived from input signals and comprise respective contributions for removing signal distortion resulting from said first window functions being applied.

16. A wideband multibeam antenna array device comprising:

the beamforming network according to claim 11; and
an array of signal conditioning chains, each comprising an RF port and one or more analogue and/or digital signal processing units,
wherein the input signal ports of the beamforming network are connected to the signal conditioning chains in a receive, Rx, mode to retrieve M beams at the output signal ports of the beamforming network.

17. A wideband multibeam antenna array device comprising:

the beamforming network according to claim 11; and
an array of signal conditioning chains, each comprising an RF port and one or more analogue and/or digital signal processing units,
wherein the output signal ports of the beamforming network are connected to the signal conditioning chains in a transmit, Tx, mode to transmit N beams applied at the input signal ports of the beamforming network.

18. A narrowband multibeam antenna array device comprising:

two or more beamforming networks according to claim 11; and
an array of signal conditioning chains, each comprising an RF port and one or more analogue and/or digital signal processing units,
wherein the input signal ports of the beamforming networks are connected to the signal conditioning chains followed by frequency demultiplexers in a receive, Rx, mode to retrieve narrowband channels associated with multiple beams at the output signal ports of individual ones of the beamforming networks.

19. A narrowband multibeam antenna array device comprising:

two or more beamforming networks according to claim 11; and
an array of signal conditioning chains, each comprising an RF port and one or more analogue and/or digital signal processing units,
wherein the output signal ports of the beamforming networks are connected to the signal conditioning chains in a transmit, Tx, mode through frequency multiplexers to transmit the narrowband channels associated with the multiple beams applied at the input signal ports of the beamforming networks.

20. A Fast Fourier Transform, FFT, processor, comprising the beam-forming network according to claim 11, wherein the FFT is oversized with respect to at least one of the N input signal ports and the M output signal ports of the beamforming network;
wherein the plurality of first weight factors and/or second weight factors can be reconfigured according to the number of N input signal ports and to the number of M output signal ports; and
wherein the plurality of first weight factors and/or second weight factors depend on a function of the amount of the oversizing of the FFT and the distributions of the input signal ports and output signal ports in respective signal domains.

* * * * *